United States Patent
Agarwal et al.

(10) Patent No.: US 10,853,114 B2
(45) Date of Patent: Dec. 1, 2020

(54) SYSTEMS AND METHODS FOR EXECUTING SOFTWARE ROBOT COMPUTER PROGRAMS ON VIRTUAL MACHINES

(71) Applicant: Soroco Private Limited, London (GB)

(72) Inventors: Sanyam Agarwal, Bengaluru (IN); Rohan Narayan Murty, Bangalore (IN); George Peter Nychis, Somerville, MA (US); Wolfgang Richter, Cambridge, MA (US); Nishant Kumar Jain, Bangalore (IN); Surabhi Mour, Bangalore (IN); Shreyas H. Karanth, Bangalore (IN); Shashank Anand, Bangalore (IN)

(73) Assignee: Soroco Private Limited, London (GB)

( * ) Notice: Subject to any disclaimer, the term of this patent is extended or adjusted under 35 U.S.C. 154(b) by 2 days.

(21) Appl. No.: 15/862,842

(22) Filed: Jan. 5, 2018

(65) Prior Publication Data

US 2018/0189093 A1    Jul. 5, 2018

Related U.S. Application Data

(60) Provisional application No. 62/442,646, filed on Jan. 5, 2017.

(51) Int. Cl.
*G06F 9/455* (2018.01)
*G06F 9/50* (2006.01)
*G06F 9/52* (2006.01)

(52) U.S. Cl.
CPC ........ *G06F 9/45558* (2013.01); *G06F 9/5016* (2013.01); *G06F 9/5055* (2013.01);
(Continued)

(58) Field of Classification Search
CPC .................................................. G06F 9/45558
See application file for complete search history.

(56) References Cited

U.S. PATENT DOCUMENTS

| 2005/0091672 | A1* | 4/2005 | Debique ................... G06F 8/20 719/328 |
| 2007/0226722 | A1* | 9/2007 | Chou ....................... G06F 8/443 717/158 |

(Continued)

FOREIGN PATENT DOCUMENTS

WO    WO 2011/162746 A1    12/2011

OTHER PUBLICATIONS

International Search Report and Written Opinion for International Application No. PCT/US2018/012508 dated Jun. 8, 2018.

*Primary Examiner* — Hang Pan
(74) *Attorney, Agent, or Firm* — Wolf, Greenfield & Sacks, P.C.

(57) ABSTRACT

Techniques for executing one or more instances of a computer program using virtual machines, the computer program comprising multiple computer program portions including a first computer program portion. The techniques include determining whether an instance of any of the multiple computer program portions is to be executed; when it is determined that a first instance of the first computer program portion is to be executed, accessing first information specifying a first set of one or more virtual machine resources required for executing the first instance of the first computer program portion; determining whether any one of the plurality of virtual machines has at least the first set of virtual machine resources available; and when it is determined that a first of the plurality of virtual machines has the first set virtual machine resources available, causing the first virtual machine to execute the first instance of the first computer program portion.

23 Claims, 24 Drawing Sheets

(52) U.S. Cl.
CPC .............. *G06F 9/5077* (2013.01); *G06F 9/52* (2013.01); *G06F 2009/4557* (2013.01)

(56) References Cited

U.S. PATENT DOCUMENTS

| | | | |
|---|---|---|---|
| 2010/0162244 A1* | 6/2010 | Tsai | G06F 9/505 718/100 |
| 2010/0306381 A1* | 12/2010 | Lublin | G06F 15/16 709/226 |
| 2012/0173979 A1* | 7/2012 | Lee | G06F 9/452 715/719 |
| 2013/0007734 A1* | 1/2013 | McCloy | G06F 9/45558 718/1 |
| 2013/0097293 A1* | 4/2013 | Gibson | H04L 43/0876 709/221 |
| 2013/0297678 A1* | 11/2013 | Schach | G06F 9/54 709/203 |
| 2014/0344830 A1* | 11/2014 | Tipparaju | G06F 9/505 718/105 |
| 2016/0259651 A1* | 9/2016 | Nychis | G06F 8/38 |

* cited by examiner

SYSTEMS AND METHODS FOR EXECUTING SOFTWARE ROBOT COMPUTER PROGRAMS ON VIRTUAL MACHINES

CROSS-REFERENCE TO RELATED APPLICATIONS

This application claims the benefit under 35 U.S.C. § 119(e) of U.S. Provisional Application Ser. No. 62/442,646, filed Jan. 5, 2017, titled "SYSTEMS AND METHODS FOR EXECUTING SOFTWARE COMPUTER PROGRAMS ON VIRTUAL MACHINES," which is incorporated by reference herein in its entirety.

BACKGROUND

A software robot computer program (hereinafter, "software robot") executing on a virtual machine may be used to control one or more computer programs (e.g., one or more application programs and/or operating systems) executing on the virtual machine to perform a task. The software robot may control the computer program(s) at least in part through their graphical user interfaces. When a computer program (e.g., a software robot, an application program, an operating system) executes on a virtual machine, the computer program uses hardware resources of the computing device executing the virtual machine such as the computing device's processor and memory.

SUMMARY

Some embodiments are directed to a system for executing one or more instances of a computer program, the computer program comprising multiple computer program portions including a first computer program portion. The system comprises: a first set of one or more computer hardware processors configured to execute a plurality of virtual machines; a controller device comprising at least one computer hardware processor configured to perform: determining whether a first instance of the first computer program portion is to be executed; when it is determined that the first instance of the first computer program portion is to be executed, accessing first information specifying a first set of one or more virtual machine resources required for executing the first instance of the first computer program portion; determining whether any one of the plurality of virtual machines has at least the first set of virtual machine resources available; and when it is determined that a first virtual machine of the plurality of virtual machines has the first set virtual machine resources available, causing the first virtual machine to execute the first instance of the first computer program portion.

Some embodiments are directed to at least one non-transitory computer-readable storage medium storing processor executable instructions that, when executed by at least one computer hardware processor, cause the at least one computer hardware processor to perform a method for executing one or more instances of a computer program using a plurality of virtual machines, the computer program comprising multiple computer program portions including a first computer program portion. The method comprises: determining whether a first instance of the first computer program portion is to be executed; when it is determined that the first instance of the first computer program portion is to be executed, accessing first information specifying a first set of one or more virtual machine resources required for executing the first instance of the first computer program portion; determining whether any one of the plurality of virtual machines has at least the first set of virtual machine resources available; and when it is determined that a first virtual machine of the plurality of virtual machines has the first set virtual machine resources available, causing the first virtual machine to execute the first instance of the first computer program portion.

Some embodiments are directed to a method for executing one or more instances of a computer program using a plurality of virtual machines, the computer program comprising multiple computer program portions including a first computer program portion. The method comprises using at least one computer hardware processor to perform: determining that a first instance of the first computer program portion is to be executed; when it is determined that the first instance of the first computer program portion is to be executed, accessing first information specifying a first set of one or more virtual machine resources required for executing the first instance of the first computer program portion; determining whether any one of the plurality of virtual machines has at least the first set of virtual machine resources available; and when it is determined that a first virtual machine of the plurality of virtual machines has the first set virtual machine resources available, causing the first virtual machine to execute the first instance of the first computer program portion.

In some embodiments, including any of the preceding embodiments, when it is determined that none of the plurality of virtual machines has the first set of virtual machine resources available, waiting to start execution of the first instance of the first computer program portion.

In some embodiments, including any of the preceding embodiments, the multiple computer program portions further include a second computer program portion different from the first computer program portion, and when it is determined that a first instance of the second computer program portion is to be executed, accessing second information specifying a second set of one or more virtual machine resources required for executing the first instance of the second computer program portion; determining whether any one of the plurality of virtual machines has at least the second set of virtual machine resources available; and when it is determined that a second virtual machine of the plurality of virtual machines has the second set virtual machine resources available, causing the second virtual machine to execute the first instance of the second computer program portion.

In some embodiments, including any of the preceding embodiments, the first set of virtual machine resources is different from the second set of virtual machine resources.

In some embodiments, including any of the preceding embodiments, the first virtual machine and the second virtual machine are a same virtual machine. In some embodiments, the first virtual machine and the second virtual machine are different virtual machines.

Some embodiments, including any of the preceding embodiments, further include maintaining a first list of available virtual machine resources for the first virtual machine; and in response to causing the first virtual machine to execute the first instance of the first computer program portion, updating the first list of available virtual machine resources to reflect that virtual machine resources in the first set of virtual machine resources used for execution of the first computer program portion are not available on the first virtual machine.

Some embodiments, including any of the preceding embodiments, further include: in response to completion of execution of the first instance of the first computer program portion, updating the list of available virtual machine resources to reflect that the first set of virtual machine resources used for execution of the first computer program portion are available on the first virtual machine.

In some embodiments, including any of the preceding embodiments, the first set of virtual machine resources includes a license to use a computer program installed on the virtual machine and/or service accessible via the virtual machine.

In some embodiments, including any of the preceding embodiments, the first set of virtual machine resources includes a user interface (UI) interactions resource.

In some embodiments, including any of the preceding embodiments, the first set of virtual machine resources includes a keyboard input resource.

In some embodiments, including any of the preceding embodiments, the first set of virtual machine resources includes a mouse input resource.

In some embodiments, including any of the preceding embodiments, the first set of virtual machine resources does not include an amount of processing power, memory, or network bandwidth available on any of the plurality of virtual machines.

Some embodiments, including any of the preceding embodiments, further include maintaining, for each of the multiple computer program portions, a respective set of work assignments to be performed by the multiple computer program portion.

In some embodiments, including any of the preceding embodiments, the multiple computer program portions further include a second computer program portion, and the maintaining comprises: maintaining a first queue of work assignments to be performed by instances of the first computer program portion; and maintaining a second queue of work assignments to be performed by instances of the second computer program portion.

In some embodiments, including any of the preceding embodiments, determining whether there is a work assignment in the first queue to be executed by an instance of the first computer program portion or a work assignment in the second queue to be executed by an instance of the second computer program portion.

In some embodiments, including any of the preceding embodiments, causing the first virtual machine to execute the first instance of the first computer program portion comprises: sending a command to the first virtual machine to begin execution of the first instance of the first computer program portion.

Some embodiments, including any of the preceding embodiments, further include identifying the multiple computer program portions within the computer program.

In some embodiments, including any of the preceding embodiments, there are at least two different versions of the first computer program portion including a first version of the first computer program portion and a second version of the first computer program portion, and, when it is determined that an instance of the first computer program portion is to be executed, the techniques further selecting either the first version or the second version of the first computer program portion; and when it is determined that the first virtual machine of the plurality of virtual machines has the first set virtual machine resources available, the techniques further include causing the first virtual machine to execute an instance of the selected version of the first computer program portion.

In some embodiments, including any of the preceding embodiments, selecting either first version or the second version of the first computer program portion to be executed comprises selecting the first version at least a specified percentage of the time.

In some embodiments, including any of the preceding embodiments, the computer program is a software robot computer program configured to control one or more other computer programs via their respective graphical user interfaces.

BRIEF DESCRIPTION OF DRAWINGS

Various non-limiting embodiments of the technology will be described with reference to the following figures. It should be appreciated that the figures are not necessarily drawn to scale.

DETAILED DESCRIPTION

Figure 1A:
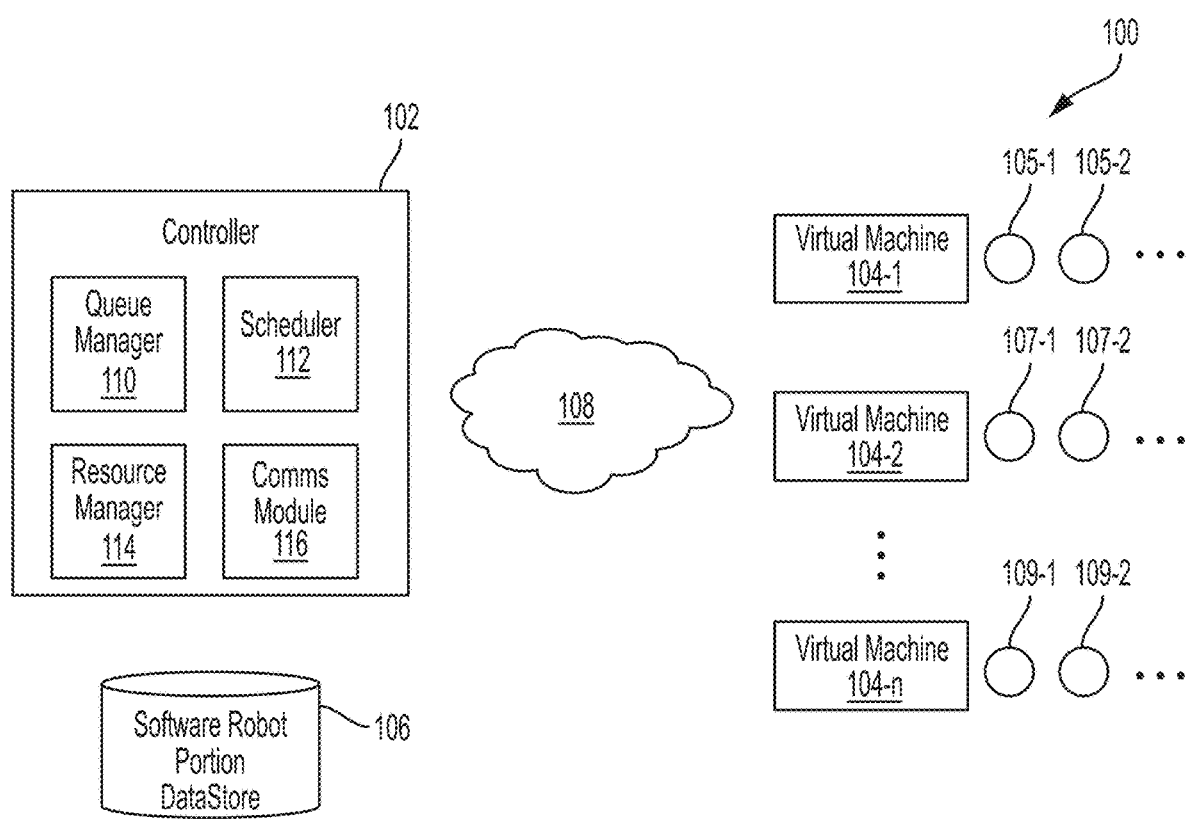
FIG. 1A is an diagram of an illustrative system in which some embodiments of the technology described herein may operate.

Software robot computer programs are computer programs configured to programmatically control one or more other computer programs (e.g., one or more application programs and/or one or more operating systems) at least in part via the graphical user interfaces of the other computer program(s). A software robot may be, for example, a computer program configured to programmatically control one or more other computer programs (e.g., one or more application programs and/or one or more operating systems) to perform one or more tasks at least in part via the graphical user interfaces (GUIs) and/or application programming interfaces (APIs) of the other computer program(s). A task may be, for example, a sequence of one or more actions (e.g., buttons clicks and/or keystrokes provides as input to one or more application programs) that culminates in an objective being completed such as resetting a password or creating a document. Some aspects of software robots are described in U.S. Patent Application Publication No. 2016/0259651, titled "Software Robots for Programmatically Controlling Computer Programs to Perform Tasks," which is a publication of U.S. patent application Ser. No. 15/059,638, filed on Mar. 3, 2016. U.S. Patent Application Publication No. 2016/0259651 is incorporated by reference herein in its entirety.

The inventors have recognized that conventional techniques of executing software robots on virtual machines are inefficient and may be improved upon. Conventional techniques for executing software robots on virtual machines involve executing a single software robot at a time on a virtual machine, which either limits throughput (the number of jobs that may be executed by the software robots in a given period of time) or increases the cost of achieving a desired level of throughput (e.g., by paying for access to the requisite number of virtual machines).

Conventional software robot execution techniques do not involve executing multiple software robots on the same desktop environment of one virtual machine because the software robots may come into conflict with one another as a result of trying to utilize the same virtual machine resource(s). For example, when two software robots control one or more computer programs via their respective graphical user interfaces, allowing these two software robots to concurrently execute on the same virtual machine may generate errors. Consider, for instance, the case where two software robots are designed to control a single application program (e.g., MICROSOFT WORD) using its graphical user interface. One software robot may click on a menu button of the application program causing the GUI of the application program to display the associated menu (e.g., clicking on the "File" button may cause the File menu to be displayed). However, suppose that before the software robot clicks on a button in the displayed (e.g., File) menu, another software robot clicks on another button in the application program's GUI (e.g., the "Edit" button so that the "Edit" menu is displayed). This action by the other software robot will cause the previously opened menu to disappear, which in turn will cause the first software robot to generate an error.

It should be appreciated, that user interface interaction conflicts, such as the illustrative conflict described above, are not the only types of conflicts that may arise when two software robots are concurrently executing on the same desktop environment of the same virtual machine. Software robots concurrently executing on the same virtual machine may come into conflict with one another as a result of trying to access, concurrently, any of numerous types of virtual machine resources, examples of which are provided herein.

In contrast to conventional approaches for executing software robots on virtual machines that involve executing one software robot at a time on a virtual machine, the inventors have developed improved techniques for executing software robots on virtual machines that allow for portions of the software robots to execute concurrently on the same virtual machine (e.g., on the same desktop environment of the same virtual machine), while avoiding any conflicts over virtual machine resources. To this end, in some embodiments, software robots are partitioned into software robot portions with each software robot portion having a corresponding set of virtual machine resource requirements. A controller manages execution of software robots by managing the execution of their constituent software robot portions on the virtual machines. When a controller determines that a software robot portion is to be executed, the controller first compares the virtual machine resources required by the software robot portion with those available on the virtual machines and identifies the virtual machine (if any) on which to execute the software robot portion. As described herein, this framework allows for multiple software robot portions to execute on the same virtual machine thereby increasing overall throughput and/or reducing cost relative to conventional approaches for executing software robots on virtual machines. The framework developed by the inventors constitutes an improvement in the computer-related technology of software robots because it allows software robots to be executed more efficiently (quicker, using fewer hardware resources, etc.). The framework developed by the inventors also constitutes an improvement in virtual machine technology, which is a computer-related technology, in that it reduces the number of virtual machines and/or virtual machine resources required in order to execute software robot computer programs.

Some embodiments of the technology described herein address some of the above-discussed drawbacks of conventional techniques for executing software robots on virtual machines. However, not every embodiment addresses every one of these drawbacks, and some embodiments may not address any of them. As such, it should be appreciated that aspects of the technology described herein are not limited to addressing all or any of the above-discussed drawbacks of conventional techniques for executing software robots on virtual machines.

Accordingly, some embodiments provide for techniques for executing one or more instances of a computer program (e.g., a software robot computer program) using multiple virtual machines. The computer program may comprise multiple computer program portions (e.g., a software robot may comprise multiple software robot portions) including a first computer program portion. A portion of a computer program may include some of processor-executable instructions and/or source code of the computer program. In some embodiments, the techniques include using a controller software program (hereinafter, "controller") to control the manner in which instances of the multiple computer program portions are executed on the virtual machines. The controller may determine whether an instance of any of the multiple computer program portions is to be executed, and when it is determined that a first instance of the first computer program portion is to be executed, the controller may: (1) access first information specifying a first set of one or more virtual machine resources required for executing the first instance of the first computer program portion; (2) determine whether any one of the plurality of virtual machines has at least the first set of virtual machine resources available; and (3) when it is determined that a first virtual machine of the plurality of virtual machines has the first set virtual machine resources available, cause the first virtual machine to execute the first instance of the first computer program portion. On the other hand, when it is determined that none of the plurality of virtual machines has the first set of virtual machine resources available, the controller may delay execution of the first instance of the first computer program portion until the necessary virtual machine resources become available.

In some embodiments, a list of available machine resources may be maintained (e.g., by the controller) for the first virtual machine and, in response to causing the first virtual machine to execute the first instance of the first computer program portion, the list of available virtual machine resources may be updated to reflect that the virtual machine resources used for execution of the first computer program portion is not available on the first virtual machine. After (e.g., in response to) completion of execution of the first instance of the first computer program portion, the list of available virtual machine resources may be updated to reflect that the virtual machine resources used for execution of the first computer program portion are once again available on the first virtual machine. In this way, once one or more virtual machine resources are allocated to a particular computer program portion instance, those virtual machine resources would not be allocated to any other computer program portion instance, until the particular computer program portion instance terminates. This "list" of available virtual machine resources may be maintained (e.g., represented in memory) using any suitable data structure(s) and any suitable format, as aspects of the technology described herein are not limited in this respect.

In some embodiments, work assignments to be performed by one or more instances of a computer program portion may be maintained (e.g., by the controller) for each of one or more (e.g., for all) computer program portions. This may be done in any suitable way. For example, in some embodiments, one or more work assignments to be performed by one or more instances of a computer program portion may be maintained in a queue. However, it should be appreciated that the work assignments are not limited to being maintained and/or managed using a queue and, in some embodiments, may be maintained using any other suitable data structure(s).

In some embodiments, two or more versions of a particular computer program portion may be available (e.g., an earlier version, such as version 1.0, and a later version, such as 2.0) and, when it is determined that an instance of the particular computer program portion is to be executed on a virtual machine, the controller may select one of the two versions and cause an instance of the selected version to be executed on the virtual machine. In some embodiments, where multiple instances of the computer program portion are to be instantiated and executed, the controller may select one version at least a threshold percentage of the time. For example, in some embodiments, the controller may select one version 60% of the time and the other version 40% of the time. In this way, the controller may perform A/B testing of the computer program portion versions (e.g., to determine which is preferable), as described in more detail below.

In some embodiments, a virtual machine resource may be any suitable resource utilized by a computer program executing on a virtual machine (with the exception of certain hardware resources of the computing device executing the virtual machine, as described below). For example, in some embodiments, a virtual machine resource may be a user interface (UI) interactions resource. A computer program having access to the UI interactions resource of a virtual machine may have permission to control one or more other computer programs executing on the virtual machine through their respective user interfaces (e.g., via a user interface API of an operating system executing on the virtual machine, such as for example, the Windows Automation API). In some embodiments, a virtual machine may have a single UI interactions resource. In other embodiments, a virtual machine may have multiple UI interactions resources.

As another example, in some embodiments, a virtual machine resource may be a keyboard input resource. A computer program having access to the keyboard input resource of a virtual machine may have permission to provide input, via a keyboard API of an operating system executing on the virtual machine, to one or more other computer programs executing on the virtual machine. Using a keyboard API of an operating system may allow for emulating (e.g., programmatically providing input equivalent to that which would have been received in response to) keyboard strokes and/or any other input that may be provided via a keyboard. In some embodiments, a virtual machine may have a single keyboard input resource.

As yet another example, in some embodiments, a virtual machine resource may be a mouse input resource. A computer program having access to the mouse input resource of a virtual machine may have permission to provide input, via a mouse API of an operating system executing on the virtual machine, to one or more other computer programs executing on the virtual machine. Using a mouse API of an operating system may allow for emulating (e.g., programmatically providing input equivalent to that which would have been received in response to) mouse movement, mouse clicks, and/or any other input that may be provided by a mouse. In some embodiments, a virtual machine may have a single mouse input resource.

As yet another example, in some embodiments, a virtual machine resource may be a license to use a computer program and/or service. When a virtual machine has a license to use a computer program and/or service, at least one instance of the computer program and/or service (the exact number of instances may depend on the terms of the license) may be accessed on the virtual machine (e.g., by a computer program portion such as a software robot portion). For example, at least one instance of a computer program may be launched on the virtual machine. As another example, at least one instance of a service (e.g., a web-based service) may be accessed through the virtual machine (e.g., by launching an Internet browser or other application program on the virtual machine to access the web-based service).

As yet another example, in some embodiments, a virtual machine resource may be a computer program installation resource for a computer program on a virtual machine. A computer program having access to a computer program installation resource for a computer program on a virtual machine may have permission to install one or more computer programs (e.g., specifically the computer program, any computer program, etc.) on the virtual machine. As yet another example, in some embodiments, a virtual machine resource may be a computer program installed on a virtual machine. The computer program may be any suitable application program and/or operating system that a computer program portion (e.g., a software program portion) may seek to access and/or control.

As yet another example, in some embodiments, a virtual machine resource for a virtual machine may be a graphical processing unit (GPU) resource. Not all virtual machines provide access to a GPU, but some virtual machines do. A computer program having access to the GPU resource of a virtual machine has the permission to use the GPU of the computing device executing the virtual machine (e.g., to perform one or more calculations and/or other operations).

As yet another example, in some embodiments, a virtual machine resource for a virtual machine may be a peripheral device resource for a peripheral device (e.g., a printer, a camera, a scanner, etc.). A computer program having access to a peripheral device resource for a peripheral device for a virtual machine may be configured to utilize the peripheral device. In some embodiments, a virtual machine may have a single peripheral device resource for each peripheral device accessible via the virtual machine.

As yet another example, in some embodiments, a virtual machine resource for a virtual machine may be a permission resource for accessing a dataset. A computer program having access to a permission resource for accessing a dataset may have permission to access the dataset.

As yet another example, in some embodiments, a virtual machine resource for a virtual machine may be an available operating system session inside a virtual machine. For example, when a virtual machine is executing the Windows Server operating system, the license of this operating system may limit the number of concurrently available sessions (e.g., two sessions). A computer program having access to an available operating system session may execute within the available operating system session.

As yet another example, in some embodiments, a virtual machine resource may be a human supervision resource. When a virtual machine has a human supervision resource, a human operator is available to monitor execution of a computer program on the virtual machine. Thus, when a computer program has access to a human supervision resource of a virtual machine, there is a human operator available to monitor execution of the computer program on the virtual machine.

As yet another example, in some embodiments, a virtual machine resource may be a remote desktop resource. A computer program having access to a remote desktop resource of a virtual machine may have permission to access the operating system executing on the virtual machine using a remote desktop service provided by the operating system.

As used herein, a "virtual machine resource" of a virtual machine does not encompass certain hardware resources of the computing device executing the virtual machine. For example, a "virtual machine resource" of a virtual machine does not include an amount of processing power (e.g., via a central processing unit (CPU), a graphics processing unit (GPU) or any other processor), an amount of memory, or an amount network bandwidth available on the computing device executing the virtual machine. In some embodiments, when a controller determines which computer program portion instances to execute on which virtual machines, this determination may be made, based on the availability of various virtual machine resources on the virtual machines, but without taking into consideration the amount of processing power, memory, or network bandwidth available on the computing device(s) executing the virtual machines. In other embodiments, however, when a controller determines which computer program portion instances to execute on which virtual machines, the controller may do based on the availability of various virtual machine resources on the virtual machines and also based on the amount of processing power, memory, or network bandwidth available on the computing device(s) executing the virtual machines, as aspects of the technology described herein are not limited in this respect.

It should be appreciated that the techniques described herein are not limited to being used for executing software robots on virtual machines. Rather, the techniques described herein may be used for efficiently executing any computer program(s) on virtual machines. Although some of the examples described herein are explained with respect to software robots, this is by way of example and not limitation. Accordingly, techniques for managing execution of software robot portion instances across virtual machines may be also applied to managing execution of computer program portion instances across virtual machines for any suitable type of computer program.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A is an diagram of an illustrative system 100 in which some embodiments of the technology described herein may operate. System 100 includes controller 102 that is configured to manage execution of one or more computer program (e.g., software robot) portions on a plurality of virtual machines 104-1, 104-2, . . . , 104-n. In some embodiments, the virtual machines 104-1, 104-2, . . . , 104-n may execute on different computing devices. However, in some embodiments, at least some (e.g., two, three, or all) of the virtual machines 104-1, 104-2, . . . , 104-n may execute on the same computing device, as aspects of the technology described herein are not limited in this respect. System 100 may include any suitable number of virtual machines (e.g., n is at least at least two, at least five, at least ten, at least 25, at least 50, between 2 and 100, etc.), as aspects of the technology described herein are not limited in this respect.

In some embodiments, each of the virtual machines may have access to a respective set of virtual machine resources. Examples of virtual machine resources are provided herein. A virtual machine may have access to any suitable number of virtual machine resources (e.g., zero, one, two, three, four, at least five, at least ten, at least 25, between 1 and 50, etc.), as aspects of the technology described herein are not limited in this respect. A virtual machine may have access to one or more counts of a particular virtual machine resource. For example, in some embodiments, a virtual machine may have access to a single keyboard input virtual machine resources. As another example, in some embodiments, a virtual machine may be configured to instantiate multiple instances of a particular software program because it has access to multiple licenses for the particular software program.

In the illustrative system 100, virtual machine 104-1 has access to a set of virtual machine resources including, but not limited to, virtual machine resources 105-1 and 105-2. Virtual machine 104-2 has access to a set of virtual machine resources including, but not limited to, virtual machine resources 107-1 and 107-2. Virtual machine 104-n has access to a set of virtual machine resources including, but not limited to, virtual machine resources 109-1 and 109-2.

In the illustrative system 100, the controller 102 is configured to communicate with virtual machines 104-1, 104-2, . . . , 104-n via network 108. Network 108 may be a local area network, a wide area network, a corporate Intranet, the Internet, any suitable combination thereof, and/or any other suitable type of network. Network 108 may include wired links and/or wireless links, as aspects of the technology described herein are not limited in this respect.

In some embodiments, controller 102 may be implemented in software as one or more software programs that, when executed, perform the functionality of controller 102. Controller 102 may be a single-threaded or a multi-threaded program. For example, in some embodiments, controller 102 may be include at least one thread that, during execution, identifies when each of one or more computer program portions is to be executed and at least one thread that, during execution, causes one or more instances of one or more computer program portions to start executing on a suitable virtual machine(s). In some embodiments, the controller 102 may be executed by a computing device different from the computing device(s) executing the virtual machines 104-1, 104-2, . . . , 104-n. In other embodiments, the controller 102 and at least one of the virtual machines 104-1, 104-2, . . . , 104-n may be executed on the same computing device.

In some embodiments, controller 102 is configured to manage execution of one or more software robot (or any other suitable computer program) portions on virtual machines 104-1, 104-2, . . . , 104-n. In some embodiments, for example, after (e.g., in response to) determining that an instance of a particular software robot portion is to be executed on a particular virtual machine, the controller 102 may access the software robot portion (e.g., the processor-executable program instructions for the software robot portion) in software robot datastore 106, provide the accessed software robot portion to the virtual machine, and cause the virtual machine to start executing the accessed software robot portion.

In some embodiments, the software robot datastore 106 may be store one or more software robot portions for one or more software robots. In some embodiments, a software robot portion may comprise a plurality of processor-executable instructions (e.g., instructions resulting from compiling source code of a compiled programming language, instructions written in an interpreted programming language, etc.) and the software robot datastore 106 may store such instructions for each of one or more software robot portions. Software robot portions may be stored in datastore 106 as files, part of a database, or in any other suitable way, as aspects of the technology described herein are not limited in this respect.

In some embodiments, the software robot datastore 106 may store additional information for each of one or more software robot portions that may be used by the controller 102 to manage execution of the software robot portions. For example, the software robot datastore may store a information indicating the virtual machine resources required for executing a software robot portion. Such information may be stored by the software robot datastore 106 in one or more configuration files (e.g., text files), variables part of software robot portion code, or in any other suitable way, as aspects of the technology described herein are not limited in this respect.

In some embodiments, software robot portion datastore 106 may be implemented on one computing device or multiple computing devices (e.g., in a distributed fashion). For example, in some embodiments, the datastore 106 may be implemented on a server configured to communicate with other components of system 100 via network 108. As another example, in some embodiments, the datastore 106 may be implemented on the same computing device as controller 106. As yet another example, datastore 106 may be implemented in a distributed fashion, for example, using the computing devices for executing controller 102, virtual machines 104-1, 104-2, . . . , 104-n, and/or any other suitable computing device(s).

In the illustrated embodiment, controller 102 comprises a plurality of modules including: queue manager 110, scheduler 112, resource manager 114, and communications module 116. It should be appreciated, however, that in other embodiments controller 102 may have one or more other modules in addition to or instead of the illustrated modules.

In some embodiments, queue manager 110 may be configured to manage communication among instances of software robot portions of the same software robot, which are executing on virtual machines 104-1, 104-2, . . . , 104-n. In some embodiments, queue manager 110 may maintain a message queue for each of one or more of the software robot portions of the same software robot. Such queues facilitate providing output of one or more software robot portion instances as input to other software robot portion instances. For example, a software robot may have portions "A", "B", and "C" and queue manager 110 may maintain a message queue for each of portions "B" and "C". Output provided by an instance of software robot portion "A" may be provided as input to an instance of software robot portion "B" by being queued into a message queue for software robot portion "B". Output provided by an instance of software robot portion "B" may be provided as input to an instance of software robot portion "C" by being queued into a message queue for software robot portion "C". A queue may be implemented in any suitable way using any suitable data structure(s). Aspects of queueing messages for software robot portions are discussed further herein including in (but not limited to) Sections V and VI and FIGS. 4A-4E and 5A-5J.

It should be appreciated that queue manager 110 is not limited to using a queue for managing communication among software robot portion instances. For example, in some embodiments, queue manager may 110 may use any other suitable data structure(s) (e.g., any suitable first in first out (FIFO) data structure, any suitable last in first out (LIFO) data structure, a priority queue, a buffer, an array, etc.) for managing communication among software robot portion instances.

In some embodiments, scheduler 112 may be configured to determine which software robot portion instances are to be executed. This may be done in any suitable way. For example, scheduler 112 may determine that an instance of a particular software robot portion is to be executed according to a schedule (e.g., a schedule indicating that an instance of the particular software robot portion is to be executed every 5 minutes, for instance, as is the case for software robot portion Alpha-1 in the example of FIGS. 5A-5J). As another example, scheduler 112 may determine that an instance of a particular software robot portion is to be executed when there is input (a "work item") for that software robot portion in a queue associated with the particular software robot portion (e.g., as is the case for software robot portion Alpha-2 in the example of FIGS. 5A-5J). Aspects of scheduling instances of software robot portions for execution are discussed further herein including in (but not limited to) Section VII and FIGS. 5A-5J.

In some embodiments, resource manager 114 may be configured to determine, for each software robot portion instance to be executed on some virtual machine, which virtual machine is to be used for executing that software robot portion instance. In some embodiments, the resource manager may maintain a list of available virtual machine resources for each of the virtual machines 104-1, 104-2, . . . , 104-n and determine whether any of these virtual machines have available all the virtual machine resource that are required for execution of a particular software robot portion instance (e.g., as specified by information associated with the software robot portion). In some embodiments, as software robot portion instances commence or complete execution on virtual machines, the resource manager 114 may update the list of available virtual machine resources for the virtual machines to reflect that some virtual machine resources are no longer available (e.g., when a software robot program instance commences execution) and/or that previously-unavailable virtual machine resources are now available (e.g., when a software robot program instance completes execution).

In some embodiments, communications module 116 is configured to communicate with virtual machines 104-1, 104-2, . . . , 104-n. Controller 112 may cause a virtual machine to start/stop executing a software robot portion instance by using communications module 116 to communicate with the virtual machine (e.g., via a message, an remote procedure call (RPC), an API call, etc.). Such communication may indicate that execution of a particular software robot portion instance is to be started/stopped. In some embodiments, the communication may include the software robot portion to be instantiated, parameters for the software robot portion instance, input values for the software robot portion instance, identifying information, and/or any other suitable information. Additional aspects of controller 102 are described herein including in (but not limited to) Sections III, V, VI, VII, and XI.

Figure 1B:
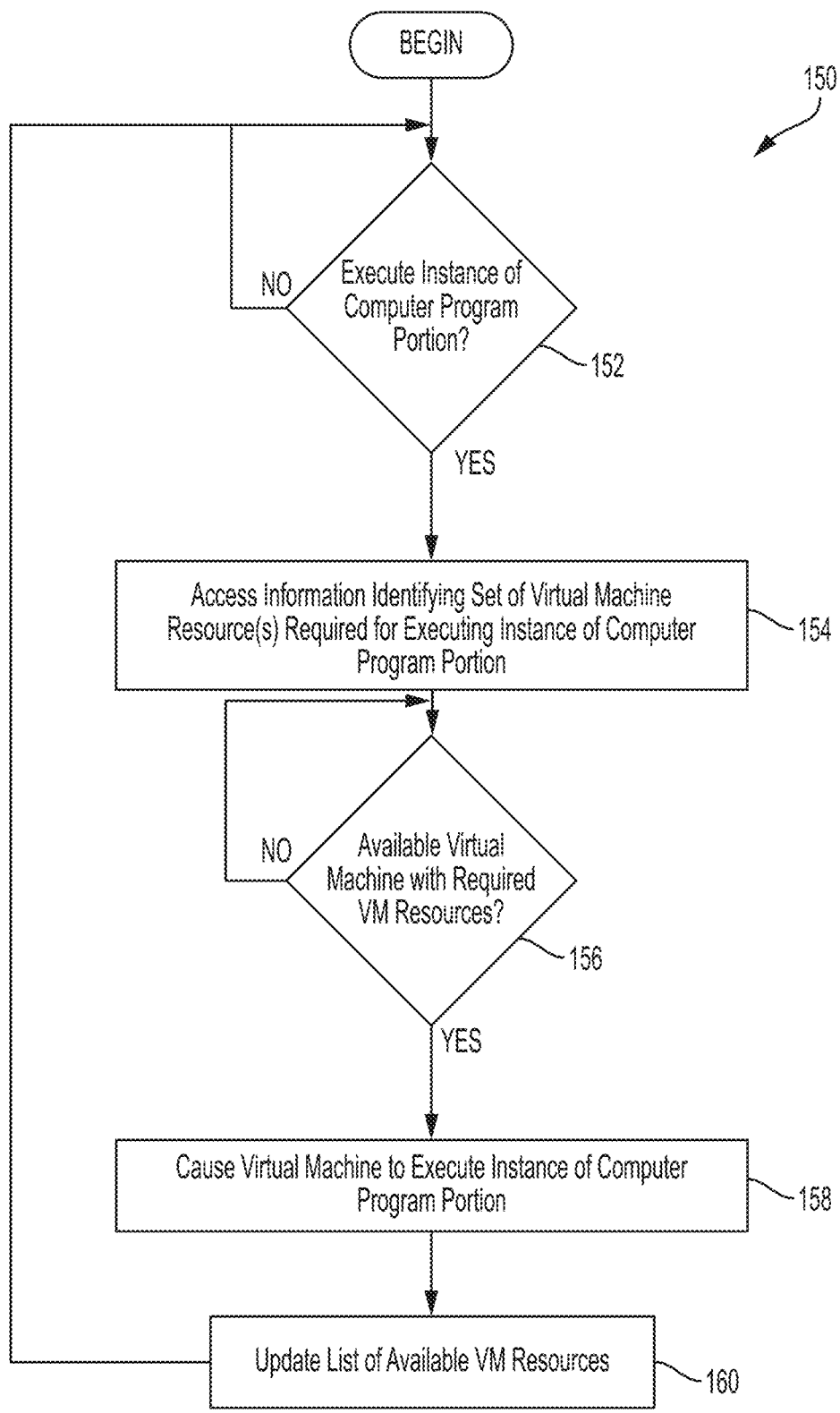
FIG. 1B is a flowchart of an illustrative process for executing computer programs on one or more virtual machines in accordance with some embodiments of the technology described herein.

FIG. 1B is a flowchart of an illustrative process 150 for executing computer programs on one or more virtual machines in accordance with some embodiments of the technology described herein. Process 150 may be executed using controller 102 described with reference to FIG. 1A. Process 150 may be executed using any suitable computing device or device(s), as aspects of the technology described herein are not limited in this respect.

Process 150 begins at decision block 152, where it is determined whether an instance of a computer program portion is to be executed. This may be done in any suitable way. For example, a schedule may be used to determine that an instance of a particular computer program portion (e.g., a schedule indicating that an instance of a particular computer program portion is to be executed every 5 minutes, for instance, as is the case for software robot portion Alpha-1 in the example of FIGS. 5A-5J). As another example, it may be determined that an instance of a particular computer program portion is to be executed when there is input (a "work item") for that computer program portion in a queue associated with the particular computer program portion (e.g., as is the case for software robot portion Alpha-2 in the example of FIGS. 5A-5J).

When it is determined that there is no instance of any computer program portions to be executed, process 150 loops back and repeats decision block 152 (e.g., after a threshold amount of time, according to a schedule, etc.). On the other hand, when it is determined that an instance of a particular computer program portion is to be executed, process 150 proceeds to act 154, where information identifying the set of one or more virtual machine resources required for executing the instance of the particular computer program portion is accessed. That information may be stored in a configuration file, in a text file, as a variable in the computer program portion and/or in any other suitable way. The accessed information may indicate which types of virtual machine resources are required and how many counts of each type of virtual machine resources are required for execution of an instance of the computer program portion.

Next, process 150 proceeds to decision block 156, where it is determined whether there is a virtual machine having the required virtual machine resources available. This determination may be made (e.g., by the resource manager 114) in any suitable way. For example, the virtual machine resources required for execution of the computer program portion instance, which were accessed at act 154, may be compared to the available virtual machine resources for each of one or more virtual machines. When none of the virtual machines have all of the required virtual machine resources available, it is determined that there is not a virtual machine on which the instance of the computer program can be executed and process 150 loops back and repeats decision block 156 (e.g., after a threshold amount of time, according to a schedule, etc.).

On the other hand, when it is determined that there is a particular virtual machine available for executing the instance of the computer program portion identified at block 152, process 150 proceeds to act 158, where the controller executing process 150, causes the particular virtual machine to start executing an instance of the computer program portion.

After the virtual machine starts executing the instance of the computer program portion, process 150 proceeds to act 160, where the list of available virtual machine resources for the particular virtual machine is updated to reflect their utilization by the instance of the computer program portion that started executing. At a later time, when the instance of the computer program portion completes execution, the list of available virtual machine resources for the particular virtual machine may be updated to reflect that they are no longer being utilized.

Some aspects of the technology described herein may be understood further based on the non-limiting illustrative embodiments described below in Sections I-XIV.

I. Software Robot Conflicts

As discussed herein, some embodiments of the technology described herein relate to improved techniques for executing software robots across multiple virtual machines. The inventors have developed techniques that facilitate developing, deploying, and executing software robots on virtual machines, which techniques enable the virtual machines to be utilized more efficiently than previously possible.

The following example illustrates a conventional approach to deploying a software robot on a virtual machine and highlights the deficiencies of this conventional approach.

Example #1

Suppose we wish to execute two software robot computer programs, "Alpha" and "Beta", to perform their respective tasks. Software robot Alpha may be configured to perform the following task:

1. Check for an incoming email containing a person's name
2. Open Firefox; go to web portal on http://www.alpha****.com, enter the person's name in the input box; and click the Submit button to obtain information about that person.
3. Reply to the received email with a responsive e-mail containing the information obtained about the person from the web portal.
4. Loop back to step 1.

Software robot Beta may be configured to perform the following task:

1. Check for email containing an order number for an order placed by a user, the user's name, and feedback about the order provided by the user.

2. Open Firefox. Go to web portal on http://www.beta****.com, enter the order number, the user's name, and the user's feedback into the web portal. Hit Submit.

3. Loop back to step 1.

Note that each of the above-described software robots returns ("loops back") to the beginning after it completes a task. Conventional software robots are designed to function in this way—operating in an infinite loop repeatedly performing the same job over and over. For example, each of the above-described software robots repeatedly processes certain types of e-mails.

The inventors have appreciated that software robots Alpha and Beta cannot be concurrently executed on the same virtual machine because they both require a virtual machine resource (the UI interactions resource), which when concurrently accessed, may cause a conflict and lead to errors. Note that each of the software robots Alpha and Beta controls a web browser (i.e., Firefox) to perform their respective jobs. Each of the software robots Alpha and Beta may be configured to control the Firefox web browser through its graphical user interface. The ability to control an application program through its graphical user interface may be achieved through the operating system executing on the virtual machine (e.g., for example using the Windows Automation API when the virtual machine is executing the Windows operating system). Thus, each of the software robots Alpha and Beta requires the UI interactions resource to operate. However, allowing two software robots to concurrently utilize the UI interactions resource of a virtual machine may generate errors, as discussed herein. Because software robots Alpha and Beta both utilize the UI interactions resource to control Firefox, these software robots cannot be concurrently executed on the same virtual machine.

As may be appreciated from the foregoing, two software robots that are designed independently of one another (i.e., they have not been designed with advance knowledge that they will run on the same virtual machine and must cooperate to share one or more virtual machine resources) cannot concurrently utilize the UI interactions resource. In the specific case of the software robots Alpha and Beta, consider what may go wrong if these robots were allowed to execute concurrently on the same virtual machine. Suppose that Alpha and Beta each receive their respective types of e-mails. Software robot Alpha then opens up the specified uniform resource locator (URL) using Firefox. While Alpha's web page is loading, software robot Beta attempts to open the URL on Firefox (oblivious to the fact that Alpha has already opened up Firefox), which it does in a second tab. Now, software robot Alpha obtains a handle to the active tab in Firefox. Although this action may be performed successfully, software robot Alpha will have obtained a handle to the browser tab containing the webpage opened up by software robot Beta! This will invariably result in one or more errors.

When one software robot interferes with the execution of another software robot, the software robots may be said to be in conflict or conflicting. It is also possible for two instances of the same software robot to interfere with one another. In this case, the software robot may be said to be in conflict with (another instance of) itself. For example, suppose that two instances of the software robot Beta are concurrently running on the same virtual machine. It is possible that two emails that came in the inbox around the same time caused one instance of Beta to write the name of a user and their feedback against the order ID entered by the other instance of Beta. This would produce a conflict.

II. Virtual Machine Resources

As discussed herein, a virtual machine may have a limited number of available virtual machine resources (e.g., a single keyboard input resource, a single UI interactions resource, a limited number of computer program installation resources, etc.). Thus, when two software robots use the same virtual machine resource and only one such virtual machine resource is available on a desktop environment of the virtual machine, the software robots may come into conflict with one another if they were to concurrently execute in the desktop environment of that virtual machine. As a result, conventional techniques for executing software robots on virtual machines allow for only one of the software robots to execute on the virtual machine at a time in order to avoid conflicts.

In some instances, when two software robots access the same virtual machine resource (e.g., a UI interactions resource) in the same desktop environment on the same virtual machine, a conflict may arise potentially leading to one or more errors. However, it should be appreciated that, in some instances, concurrent access of certain types of virtual machine resources need not necessarily result in a conflict or an error. For example, a human operator may be able to oversee execution of multiple software robots, so that even if two software robots were to concurrently utilize the same human supervision resource (i.e., the same human operator is supervising execution of the two software robots) no conflict may arise.

III. Controller

In some embodiments, a "controller" may be a computer program configured to manage (e.g., schedule, start, stop, control, etc.) execution of one or more other computer programs (e.g., software robots) on one or multiple virtual machines. In some embodiments, the controller may be configured to execute on a computing device configured to communicate with the computing device(s) executing the virtual machine(s) thereon. The controller may be implemented using any suitable programming language, as aspects of the technology described herein are not limited in this respect.

Figure 2:
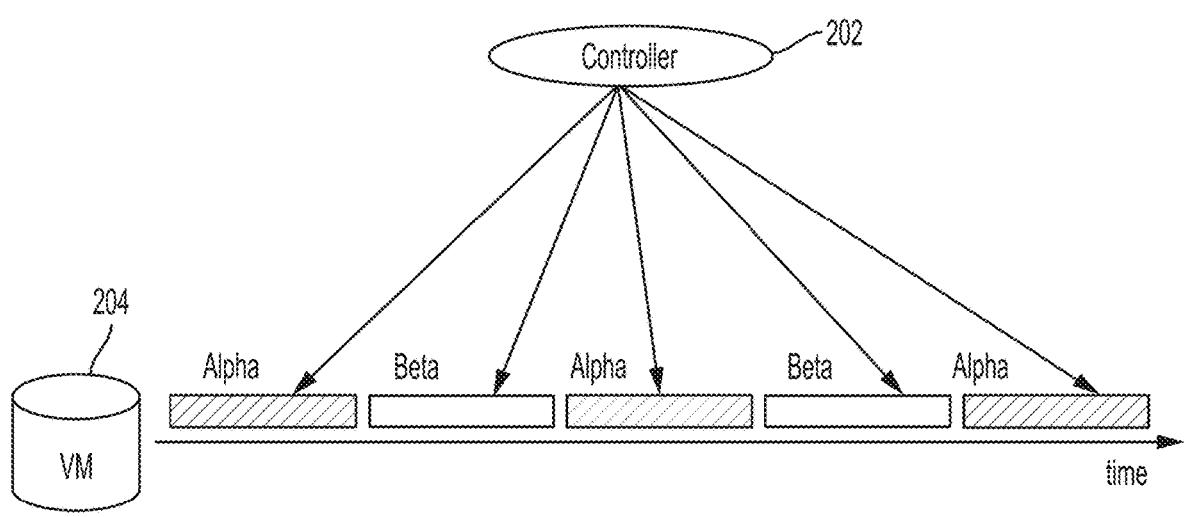
FIG. 2 is a diagram illustrating sequential one-at-a-time execution of software robots.

In some embodiments, the controller may be configured to manage execution of two conflicting software robots on the same virtual machine by executing them in an alternating fashion. For example, as shown in FIG. 2, controller 202 may cause the software robot Alpha (of Example #1) and the software robot Beta (of Example #1) to execute on virtual machine 204 in alternating half hour intervals.

In some embodiments, a controller may allow multiple software robots to execute concurrently on the same virtual machine, if these software robots do not use the same virtual machine resources and, therefore, are not in conflict with one another.

In some embodiments, a controller may be configured to control execution of one or more software robots, each of which comprises multiple software robot portions, on one or multiple virtual machines. The controller may be configured to schedule instances of the various software robot portions for execution on one or more virtual machines. The controller may be configured to manage execution of the software robot portion instances on the virtual machine(s). For example, the controller may be configured to commence execution of one or more instances of one or more software robot portions on a virtual machine, provide input to the software robot portion instance(s) executing on the virtual machine, and/or receive output generated by the software robot portion instance(s) executing on the virtual machine. Aspects of how a controller schedules and manages execution of software robot portion instances on one or more virtual machines are described herein.

IV. Software Robot Portions

As described above, a controller may execute conflicting software robots on the same virtual machine so long as these conflicting software robots are not executed concurrently. However, the inventors have recognized that partitioning two conflicting software robots into constituent software robot portions may allow for more efficient execution of the software robots on one or more virtual machines, as illustrated in the example below.

Example #2

Consider two software robots Alpha and Beta (different from the software robots in Example 1 above) that perform their respective tasks. Software robot Alpha may be configured to perform the following task when executed:
1. Open Firefox. Login to web portal on http://www.alpha****.com. Get the quotes for a stock price.
2. Run CPU intensive calculations that take hours to complete to determine the quantity of stock to buy.
3. Open Firefox. Login to web portal on http://www.alpha****.com. Enter the determined quantity of stock to buy. Click on the Buy button.
4. Loop back to step 1.

Software robot Beta may be configured to perform the following task when executed:
1. Open Firefox. Login to web portal on http://www.beta****.com. Keep checking if any user has registered a new complaint.
2. If there is a new complaint. Forward it via email to the right team.
3. Respond to the complaint indicating the team to which it has been forwarded.
4. Loop back to step 1.

Since both software robots Alpha and Beta use the "UI Interactions" resource (they both are controlling the Firefox Internet browser through its graphical user interface in order to access a web portal and interact with it) they conflict with one another. As illustrated in the "conflict graph" of FIG. 3A, both of software robot 302 (Alpha) and 304 (Beta) requires the UI interactions resource 304, as shown by the solid arrows from the rectangles representing the software robots to the circle representing the virtual machine resources, which places them in conflict with one another (as shown by the dashed line). As a result, the controller cannot execute software robot Beta on the same virtual machine as software robot Alpha, even while Alpha is running the time-intensive CPU calculations (in its step #2), and not using the "UI interactions" resource.

However, suppose that the software robot Alpha were partitioned into three constituent software robot portions—Alpha-1, Alpha-2, and Alpha-3, whose functionality is as follows:

Alpha-1:
1. Open Firefox. Login to web portal on http://www.alpha****.com. Get the quotes for a stock price.
2. Send this information to software robot portion Alpha-2.
3. Terminate.

Alpha-2:
1. Receive the stock quotes sent by software robot portion Alpha-1.
2. Run CPU intensive calculations that take hours to complete to determine the quantity of stock to buy.
3. Send information indicating the quantity of stock to buy to software robot portion Alpha-3.
4. Terminate.

Alpha-3:
1. Receive the information indicating the quantity of stock to buy sent by software robot portion Alpha-2.
2. Open Firefox. Login to web portal on http://www.alpha****.com. Enter the quantity of stock to buy. Click on the Buy button.
3. Terminate.

Each of these software robot portions terminates after completion. By contrast, conventional software robots include a loop so that they need not be started and stopped. As discussed above, this may lead to errors such as memory leaks. By contrast, in the software robot execution framework described herein, the controller manages the process of starting execution of various instances of software robot portions. Memory leaks may be avoided because the software robot portion instances are not repeatedly executed for multiple days, weeks, or months at a time.

Figure 3A:
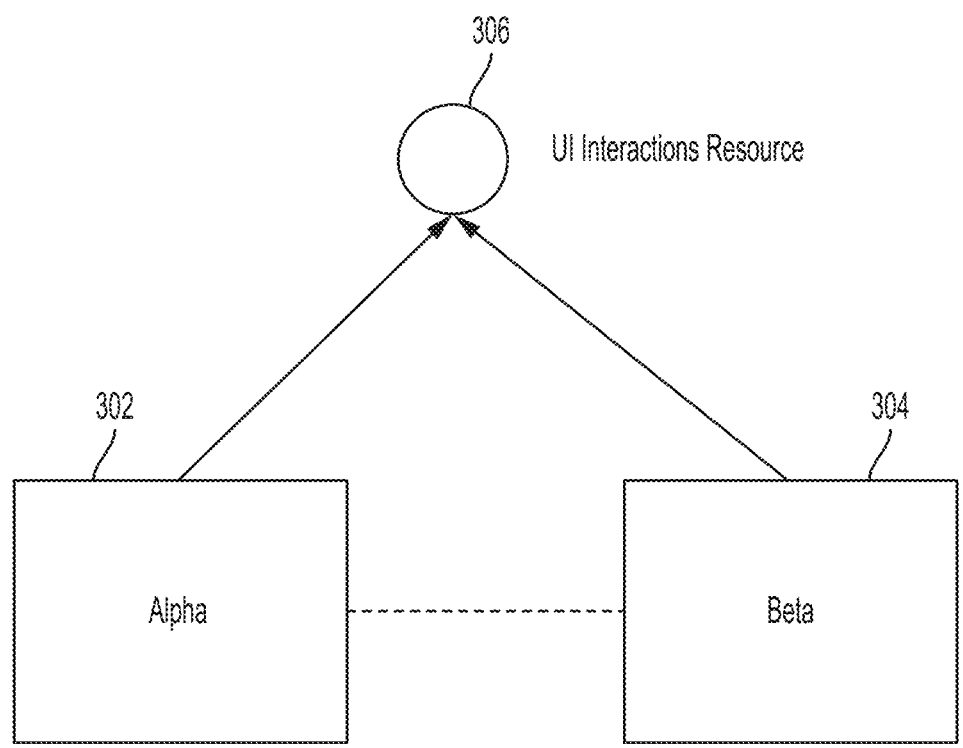
FIG. 3A is a diagram illustrating two software robots having a virtual machine resource conflict.
Figure 3B:
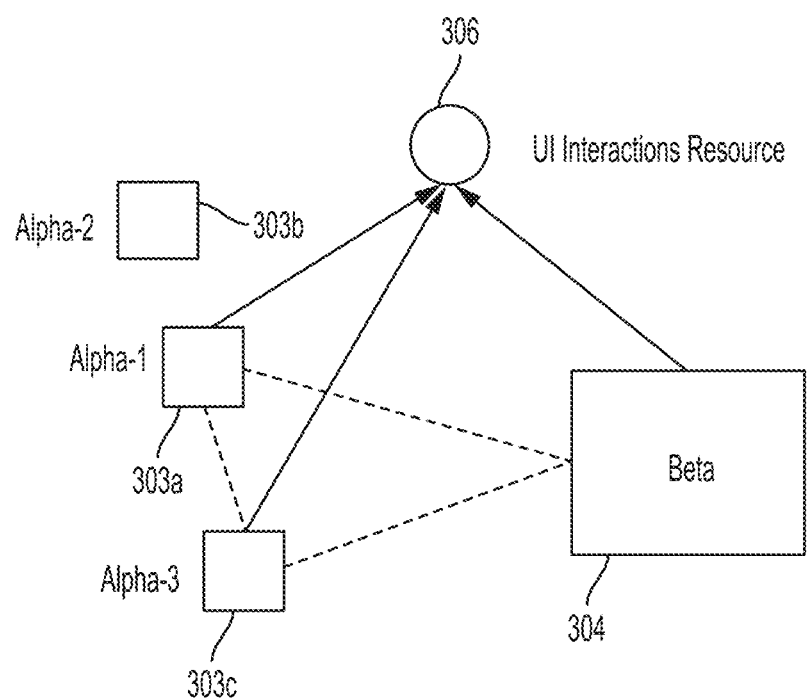
FIG. 3B is a diagram illustrating the virtual machine resource conflict resulting from partitioning into three portions one of the two software robots shown in FIG. 3A, in accordance with some embodiments of the technology described herein.

Now instead of considering virtual machine resource conflict between the software robots Alpha and Beta (as illustrated in FIG. 3A), consider the potential conflicts over virtual machine resources between the portions of software robot Alpha (i.e., portions Alpha-1, Alpha-2, and Alpha-3) and the software robot Beta. As illustrated in the conflict graph of FIG. 3B, the following three conflicts exist:
1. The software robot portion Alpha-1 (indicated by reference numeral 303a) and the software robot Beta (indicated by reference numeral 304) conflict with one another because they both use the "UI interactions" virtual machine resource 306 to control the Firefox web browser.
2. The software robot portion Alpha-3 (indicated by reference numeral 303c) and the software robot Beta conflict with one another because they both use the "UI interactions" virtual machine resource to control the Firefox web browser.
3. The software robot portions Alpha-1 and Alpha-3 conflict with one another because they both use the "UI interactions" virtual machine resource to control the Firefox web browser.

However, note that the software robot portion Alpha-2 (indicated by reference numeral 303b) is not in conflict with software robot Beta because Alpha-2 does not use the "UI Interactions" resource, and can be executed concurrently with software robot Beta on the same virtual machine. This is a major win because the execution of Alpha-2 is computationally intensive and, now, can be executed concurrently with software robot Beta using the same virtual machine desktop environment. This example illustrates the power of the software robot execution framework described herein—controlling execution of software robots by controlling execution of software robot portions can reduce the number of conflicts thereby providing an increase in throughput and/or efficiency with which software robots can be executed on one or more virtual machines.

V. Work Queue

As may be appreciated from the foregoing Example #2, in some embodiments, software robot portions of a software robot may need a mechanism for communicating with one another. For instance, in Example #2, the software robot portion Alpha-1 needs a way to provide information to software robot portion Alpha-2, and portion Alpha-2 needs a way to receive information from software robot portion Alpha-1. Similarly, software robot portion Alpha-2 needs a way to provide information to software robot portion Alpha-3, and Alpha-3 needs a way to receive information from software robot portion Alpha-2.

In some embodiments, instances of software robot portions may communicate with one another using messages. In some embodiments, a network service may be used to facilitate communication among software robot portion instances executing on one or multiple virtual machines. The network service may receive a message directed to a particular software robot portion and route the message to the software robot portion.

In some embodiments, the network service may maintain a message queue for each of at least some (e.g., all) software robot portions and, upon receiving a message directed to a particular software robot portion, direct the received message to the queue for the particular software robot portion. For example, to facilitate communication among the software robot portions Alpha-1, Alpha-2, and Alpha-3, in the above illustrative Example #2, the network service may maintain a queue for each of the software robot portions (i.e., a queue for portion Alpha-1, a queue for portion Alpha-2, and a queue for portion Alpha-3).

It should be appreciated that in embodiments where a message service maintains a message queue for a particular software robot portion, this message queue may be used to maintain messages for all instances of the software robot portion (rather than maintaining different message queues for different instances of the same software robot portion). For example, the message service may maintain a message queue for software robot portion Alpha-2 and, when multiple instances of the software robot portion Alpha-2 are executing on one or more virtual machines, each instance Alpha-2 may be configured to receive messages from this one message queue.

A message may be provided to an instance of a software robot portion from the message queue associated with the software robot portion in any suitable way. For example, in some embodiments, the controller and/or network service may provide (e.g., push) messages from a message queue to an instance of the software robot portion. In other embodiments, an instance of a software robot portion may obtain (e.g., pull) messages from the message queue with which the software robot portion is associated.

In the illustrative embodiments described below, the network service termed "Work Queue" maintains a message queue for each software robot portion. However, it should be appreciated, that a network service is not limited to using a queue for managing messages directed to a software robot portion and may use any other suitable data structure or mechanism (e.g., any suitable first in first out (FIFO) data structure, any suitable last in first out (LIFO) data structure, a priority queue, a buffer, an array, etc.) for managing messages for the software robot portion.

In some embodiments, the Work Queue network service provides the following functionality:

Queueing messages into a queue associated with a particular software robot portion.

Dequeueing messages from a queue associated with a particular software robot portion.

Assigning a priority to a message in a queue. This priority may be assigned when the message is first queued (but may be assigned at another time, in other embodiments). In some embodiments, the message with the highest priority in a particular queue may be dequeued first.

A message may comprise a key-value pair. A queue may be used to search for messages having a key of interest without removing the message for the queue.

In some embodiments, each software robot portion of a software robot may be associated with exactly one message queue. Messages for instances of a particular software robot portion are provided to the message queue associated with the particular software robot portion, and instances of the particular software robot portion may receive messages only from the single queue with which the particular software robot portion is associated.

In some embodiments, instances of software robot portions of a software robot may be configured to queue messages to any queue associated with a software robot portion of that same software robot. In some embodiments, the controller may control any queue of any software robot portion of any software robot. For example, the controller may add messages to, remove messages from, read from, write to, and/or modify contents of any queue of any software robot portion of any software robot.

In some embodiments, the name and/or identifier of a queue associated with a software robot portion may be the same as the name and/or identifier of the software robot portion itself. For example, the queue associated with software robot portion Alpha-1 may be named "Alpha-1". Additionally, the queues may be name-spaced by the name of the software robot. This simply means that if two software robots (e.g., A and B) have software robot portions having the same name (e.g., P1), then we can still distinguish between the two queues for the two portions (P1 of A and P1 of B) because they will be named using the names and/or identifiers of the software robots and the software robot portions (e.g., A.P1 and B.P1). Thus a message queue for a portion of a software robot may be identified using the name and/or identifier of the software robot (e.g., A or B) and the name and/or identifier of the software robot portion (e.g., P1).

The following example illustrates how the software robot portions Alpha-1, Alpha-2, and Alpha-3, of software robot Alpha from Example #2, may communicate using the Work Queue network service.

Alpha-1:
1. Open Firefox. Login to web portal on http://www.alpha****.com. Get the quotes for a stock price.
2. Queue <stock name, stock price> in the queue associated with software robot portion Alpha-2.
3. Terminate.

Alpha-2:
1. Dequeue <stock name, stock price> from the queue associated with portion Alpha-2.
2. Run CPU intensive calculations that take hours to complete to determine the quantity of stock to buy.
3. Queue the <stock name, stock price, quantity to buy> into the queue associated with software robot portion Alpha-3.
4. Terminate.

Alpha-3:
1. Dequeue <stock name, stock price, quantity to buy> from the queue associated with software robot portion Alpha-3.
2. Open Firefox. Login to web portal on http://www.alpha****.com. Enter the quantity of stock to buy. Click on the Buy button.
3. Terminate.

Any message queued into/dequeued from a message queue of a software robot portion may be sometimes termed "work" herein. For example, in the above example, an instance of software robot portion Alpha-2 needs to dequeuer the work <stock name, stock price> to make progress.

VI. Software Robot Portion Resource Requirements and Available VM Resources

As described herein, an instance software robot portion may require a set of one or more virtual machine resources for execution. Accordingly, when the controller determines that the instance of the software robot portion is to be executed, the controller determines whether any virtual machine has at least the required set of virtual machine resources available. When the controller determines that there is a virtual machine that has the required set of virtual machine resources available, the controller may cause the virtual machine to execute the instance of the software robot portion.

In some embodiments, to facilitate the above-described functionality, a controller may maintain, for each software robot portion of a software robot, a respective list of virtual machine resources required for execution of instances of the software robot portion. In some embodiments, the list may identify each required virtual machine resources and the required number for each required virtual machine resource (e.g., the number of required software licenses for a particular computer program when the required virtual machine resource is a license for the particular computer program). The list may be maintained using any suitable data structure(s) and may be maintained in any suitable format, as aspects of the technology described herein are not limited in this respect. The list of virtual machine resources required by a software robot portion may be termed a "requirements list" for the software robot portion.

Additionally, in some embodiments, the controller may also maintain a list of available virtual machine resources for each of one or more virtual machines that may be used for executing instances of the software robot portion. This list may be termed a "resource list." The resource list for a particular virtual machine may identify at least some (e.g., all) of the virtual machine resources that is available on the particular virtual machine. For each type of available virtual machine resource on the virtual machine, the resource list may identify a number of available virtual machine resources of that type (e.g., if a software license for a computer program is an available software resource, the resource list may further identify the number of software licenses available for the computer program). Additionally or alternatively, the resource list may identify one or more virtual machine resources on the virtual machine that are presently not available. In this way the controller may track the availability of one or more utilized virtual machine resources to determine whether any of them becomes available in the future. The resource list for a virtual machine may be maintained using any suitable data structure(s) and in any suitable format, as aspects of the technology described herein are not limited in this respect. Some illustrative examples are provided below.

The following is an example of a resource list for a virtual machine having one available UI interactions resource, one keyboard input resource, and one mouse input resource.

Example Resource List:
UI Interactions: 1
Keyboard: 1
Mouse: 1

In a circumstance where an operating system offers two screens isolated from one another, the resource list for a virtual machine running that operating system may be:

UI Interactions: 2
Keyboard: 1
Mouse: 1.

The following is an example of a software robot Alpha, which may be used by a cancer diagnostics lab, and its associated requirements list.

Software robot Alpha may be configured to perform the following functionality:
1. Receive an e-mail containing an ultrasound image, blood test reports, and information identifying a patient.
2. Provide ultrasound image to proprietary software S-1, which runs for 20 minutes and produces analysis report R.
3. Provide report R and blood test reports to another proprietary software S-2, which runs for 20 minutes and produces a Yes/No decision.
4. Generate a single PDF file containing the ultrasound image, the report R, and the blood test report using proprietary software S-3, which runs for 20 minutes.
5. E-mail the generated PDF file and the Yes/No decision to a certified doctor for verification.
6. Loop back to Step 1.

The requirements list for software robot Alpha is as follows:
UI Interactions: 1
Keyboard: 1
License for S-1: 1
License for S-2: 1
License for S-3: 1

In order for a virtual machine to execute software robot Alpha, the available virtual machine resources on the virtual machine must include all resources on the requirements list. As such, the resource list of a virtual machine should include (be a superset of) the requirements list for the software robot Alpha.

Let's use this example of software robot Alpha to further illustrate the advantages provided by the software robot execution framework described herein. Suppose, that a software license for each of the software programs S-1, S-2, and S-3 costs $100/month per virtual machine (a total of $300/month per virtual machine). Since each of the software programs S-1, S-2, and S-3 takes 20 minutes to execute, each run of software robot Alpha on a single virtual machine would take an hour. Thus, the throughput would be 1 diagnosis per hour. If the requirements were to be 3 diagnoses per hour, then three instances of software robot Alpha would need to be run, with each instance running on its own respective virtual machine. As a result, three software licenses on each of the virtual machines would have to be purchased bringing the overall licensing cost to $900/month ($100/license for each of three copies of each of S-1, S-2, and S-3). As such, without using the software robot execution framework described herein, the throughput would be 3 diagnoses per hour and the licensing cost would be $900/month. By contrast, using the software robot execution framework developed herein, the same level of throughput may be maintained at one third of that cost, as described in more detail below.

Suppose that software robot Alpha were partitioned into three constituent software robot portions Alpha-1, Alpha-2, and Alpha-3 that perform the following functions:

Alpha-1:
1. Receive an e-mail containing an ultrasound image, blood test reports, and information identifying a patient.
2. Provide ultrasound image to proprietary software S-1, which runs for 20 minutes and produces analysis report R.

3. Queue the message of <ultrasound image, report R, blood test reports> to queue associated with software robot portion Alpha-2.
4. Terminate.

Alpha-2
1. Dequeue the message of <ultrasound image, report R, blood test reports> from the queue associated with software robot portion Alpha-2.
2. Provide report R and blood test reports to another proprietary software S-2, which runs for 20 minutes and produces a Yes/No decision.
3. Queue the message of <ultrasound image, report R, blood test, reports, Yes/No decision> to the queue associated with software robot portion Alpha-3.
4. Terminate.

Alpha-3
1. Dequeue the message of <ultrasound image, report R, blood test, reports, Yes/No decision> from the queue associated with software robot portion Alpha-3.
2. Generate a single PDF file containing the ultrasound image, the report R, and the blood test report using proprietary software S-3, which runs for 20 minutes.
3. E-mail the generated PDF file and the Yes/No decision to a certified doctor for verification.
4. Terminate.

The requirements list for software robot portion Alpha-1 is:
UI Interactions: 1
Keyboard: 1
License for S-1: 1

The requirements list for software robot portion Alpha-2 is:
UI Interactions: 1
Keyboard: 1
License for S-2: 1

The requirements list for software robot portion Alpha-3 is:
UI Interactions: 1
Keyboard: 1
License for S-3: 1

Now suppose we want to run the above software robot Alpha, composed of the three portions Alpha-1, Alpha-2, and Alpha-3, so that the same throughput of 3 diagnoses per hour is produced. This may be achieved using virtual machines VM-1, VM-2, VM-3 having the following resource lists:

VM-1:
UI Interactions: 1
Keyboard: 1
License for S-1: 1

VM-2:
UI Interactions: 1
Keyboard: 1
License for S-2: 1 Det

VM-3:
UI Interactions: 1
Keyboard: 1
License for S-3: 1

Figure 4A:
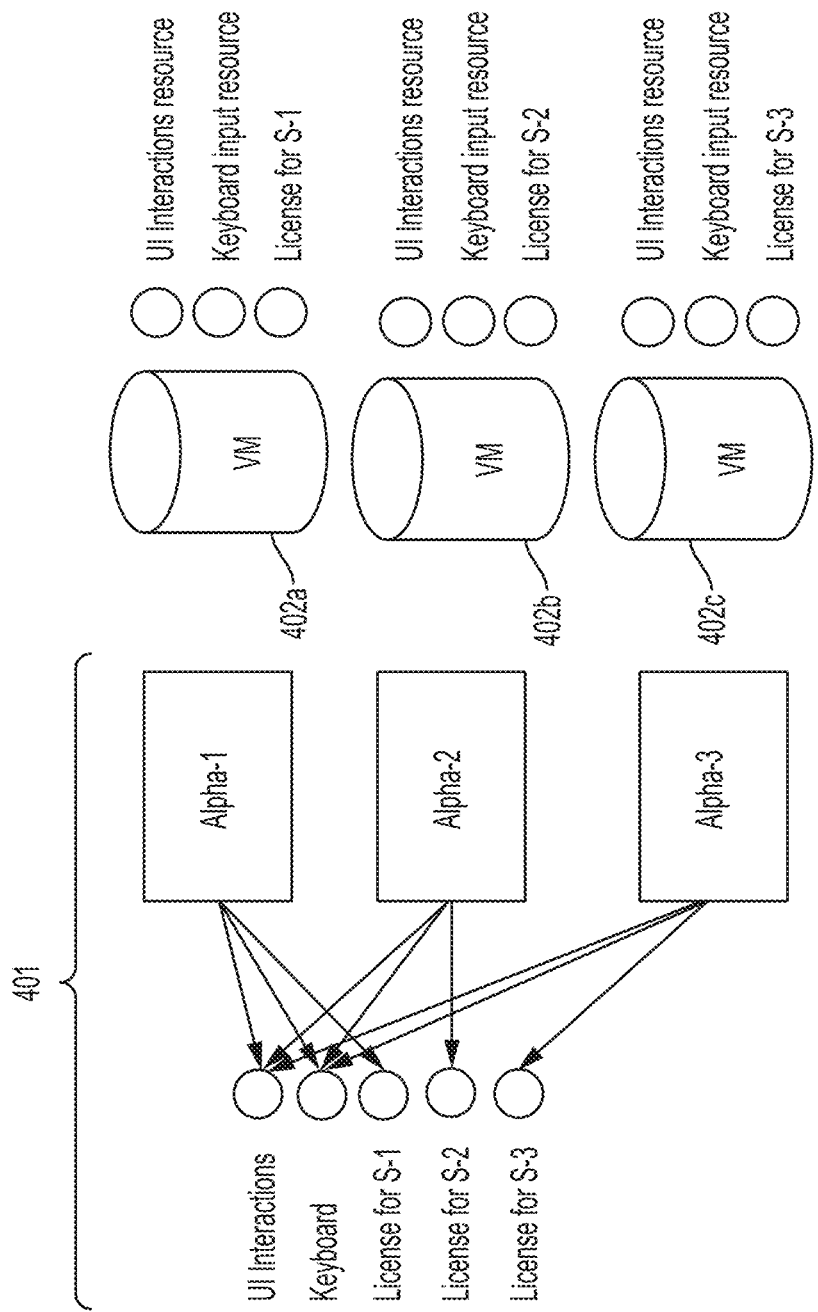
FIGS. 4A-4E show an illustrative example of how software robot portion instances may be executed on a plurality of virtual machines, in accordance with some embodiments of the technology described herein.

The situation is illustrated in FIG. 4A, which shows the requirements lists for each of software robot portions (Alpha-1, Alpha-2, and Alpha-3), and the resources lists for each of the three virtual machines VM-1, VM-2, and VM-3, indicated in FIG. 4A as virtual machines 402a, 402b, and 402c, respectively. Note that this configuration of virtual machines requires buying only a single license for each of software programs S-1, S-2, S-3. The competing virtual machine resource requirements are shown using graph 401, with circles representing virtual machine resources and squares representing software robot portions for this configuration shows The manner in which such a configuration may operate is illustrated below with reference to FIGS. 4B-4E.

Suppose that there is a large number of emails pending in the inbox, with each e-mail including an ultrasound image, blood test reports, and information identifying a patient. The following is a possible timeline of events, in some embodiments, after the controller is provided with a command to start running the software robot portions Alpha-1, Alpha-2, and Alpha-3 on virtual machines 402a, 402b, and 402c.

Figure 4B:
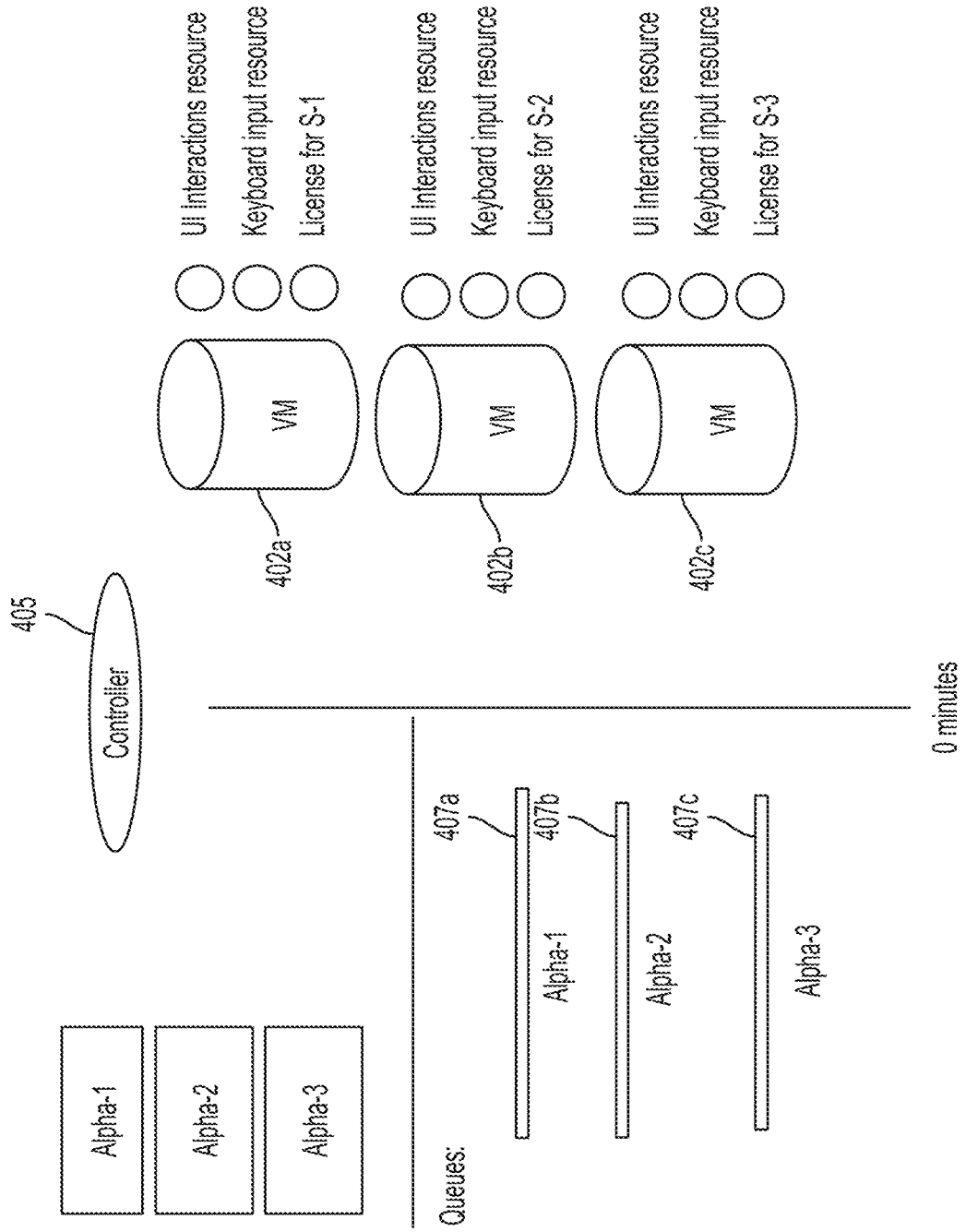

As shown in FIG. 4B, initially (at time t=0), there are no instances of any software robot portion (from among Alpha-1, Alpha-2, and Alpha-3) running on any of virtual machines 402a, 402b, and 402c. Accordingly, there are no work items in any of the queues 407a, 407b, and 407c associated with respective software robot portions Alpha-1, Alpha-2, and Alpha-3.

Figure 4C:
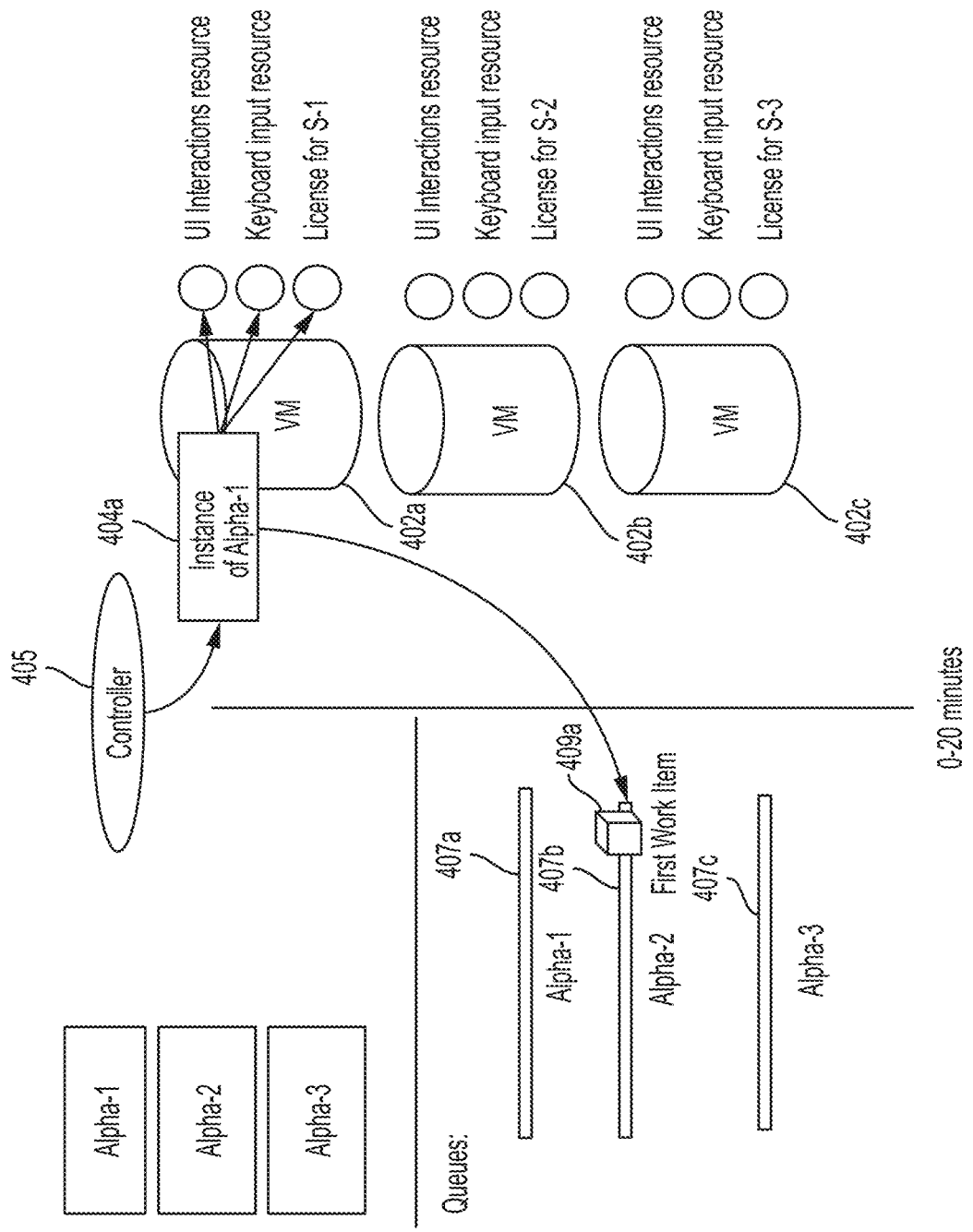

Next, as shown in FIG. 4C, in the first 0-20 minutes, controller 405 causes instance 404a of software robot portion Alpha-1 to start running on virtual machine 402a. Instance 404a may read an email E-1 and provides the ultrasound image in E-1 to software program S-1, which runs for 20 minutes. After 20 minutes. the report R is generated and is queued into the queue 407b associated with software robot portion Alpha-2 (shown, in FIG. 4C, as work item 409a in the queue 407b for Alpha-2).

Figure 4D:
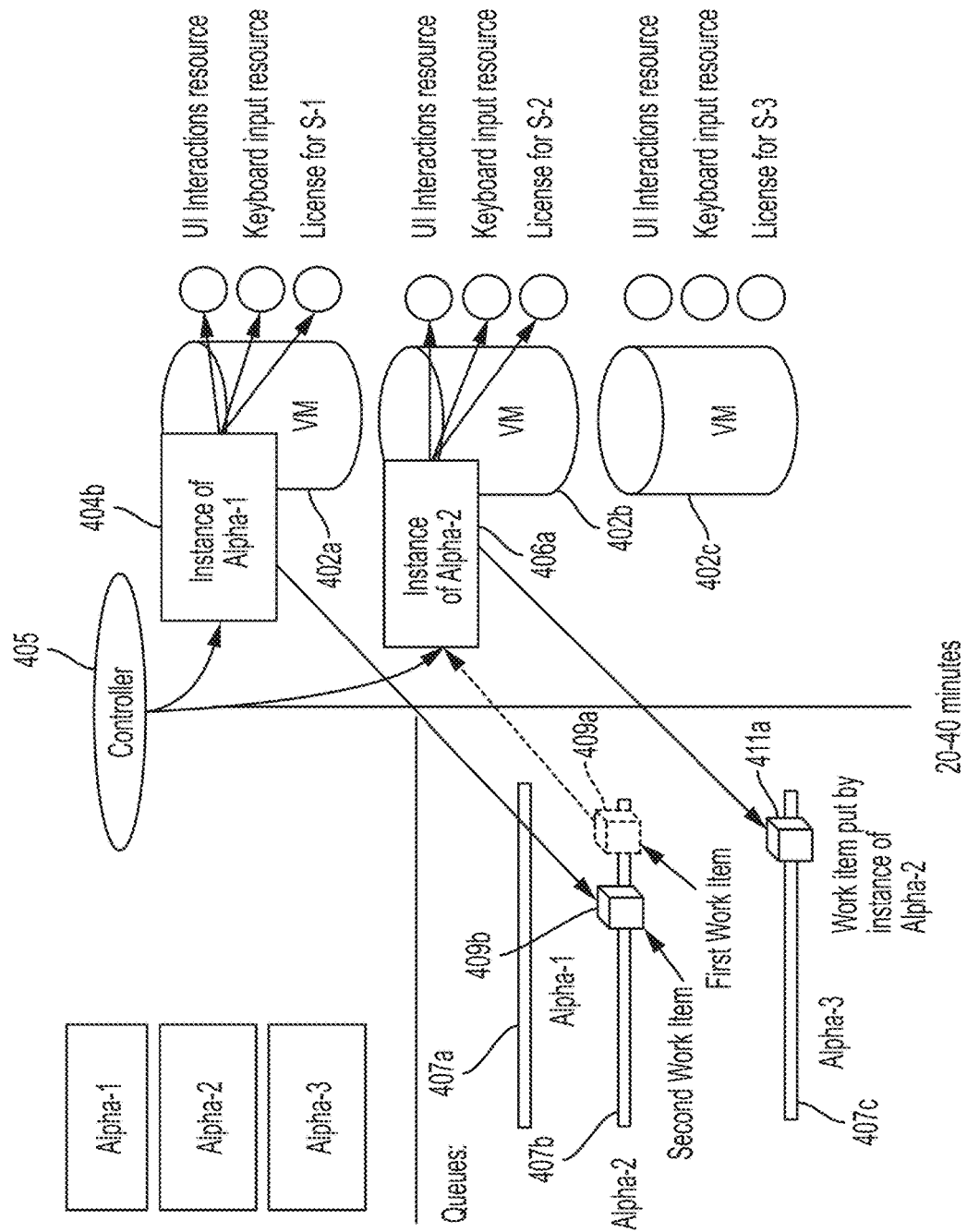

Next, as shown in FIG. 4D, in the time period of 20-40 minutes, the controller 405 causes instance 404b of software robot portion Alpha-1 (different from instance 404a) to execute on virtual machine 402a. Instance 404b reads an email E-2, and provides the ultrasound image in E-2 to software program S-1, which runs for 20 minutes. After 20 minutes, the report R is generated and is queued, as work item 409b, into the queue 407b associated with Alpha-2.

In this same time period, the controller 405 causes an instance 406a of software robot portion Alpha-2 starts running on virtual machine 402b. Instance 406a: (1) dequeues, from the queue 407b associated with Alpha-2, the work item 409a that instance 404a had previously queued; (2) processes the dequeued message; and (3) queues the resulting message, as work item 411a, into the queue 407c associated with software robot portion Alpha-3.

Figure 4E:
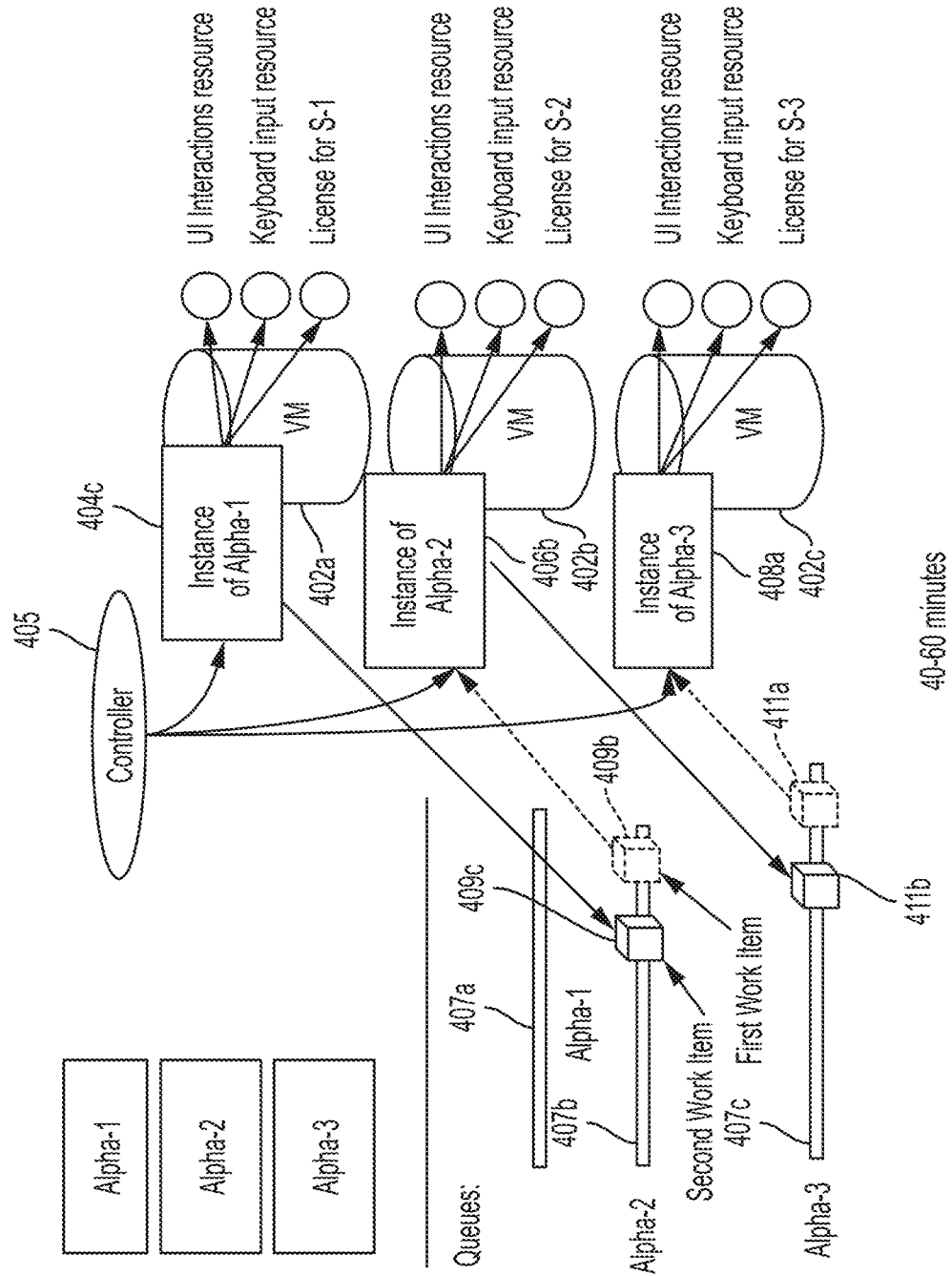

Next, as shown in FIG. 4E, in the time period of 40-60 minutes, the controller 405 causes instance 404c of software robot portion Alpha-1 to execute on virtual machine 402a. Instance 404c reads an email E-3, and provides the ultrasound image in E-3 to software program S-1, which runs for 20 minutes. After 20 minutes, the report R is generated and queued, as work item 409c, into the queue 407b associated with Alpha-2.

In this same time period, the controller 405 causes an instance 406b of software robot portion Alpha-2 (different from instance 406a) to execute on virtual machine 402b. Instance 406b: (1) dequeues, from the queue 407b, the work item 409b that instance 404b had previously queued; (2) processes the dequeued message; and (3) queues the resulting message, as item 411b, in the queue 407c associated with software robot portion Alpha-3.

Finally, in this same time period, the controller 405 causes an instance 408a of software robot portion Alpha-3 to execute on virtual machine 402c. Instance 408a: (1) dequeues the work item 411a message that instance 406a of software robot portion Alpha-2 queued; (2) processes it accordingly; and (3) provides the consolidated results to a doctor.

Thus, every 20 minutes, the following things happen in parallel and independently of one another:

An instance of software robot portion Alpha-1 executes on virtual machine 402a. The instance reads the email E-(n), provides the ultrasound image in the e-mail E-(n) to software program S-1, which runs for 20 minutes. After 20 minutes, a report R is generated and queued, into queue 407b associated with software robot portion Alpha-2.

An instance of software robot portion Alpha-2 executes on virtual machine 402b. The instance dequeues the message that an instance of Alpha-1 had queued corresponding the email E-(n-1), processes it accordingly, and the queues the results into the queue 407c associated with the software robot portion Alpha-3.

An instance of software robot portion Alpha-3 executes on virtual machine 402c. The instance dequeues the message that Alpha-2 queued corresponding to the email E-(n-2), processes it accordingly, and provides the consolidated results to a doctor.

As a result, a single diagnosis will be completed every 20 minutes. Thus, throughput of three diagnoses/hour is achieved for a third of the cost (i.e., $300/month) that would have been incurred had the software robot execution techniques described herein not been employed.

VII. Additional Details about Controller

As discussed above, a controller may be configured to coordinate execution of multiple software robots on multiple virtual machines such that the software robots do not conflict with one another when executing on the same virtual machine. In some embodiments, the controller may be configured to coordinate execution of one or more instances of multiple software robot portions so they do not conflict with one another when executing on the same virtual machine.

Accordingly, in some embodiments, a controller may be configured to perform at least the following functions: (1) determining when an instance of a software robot portion is to be executed on some virtual machine; (2) identifying the virtual machine resource(s) required to execute the instance of software robot portion; (3) identifying a virtual machine that has available the virtual machine resources required to execute the instance of the software robot portion; and (4) causing an instance of the software robot portion to begin executing on the identified virtual machine.

A controller may determine whether to start execution of an instance of a particular software robot portion in any suitable way. For example, in some embodiments, For example, when the software robot portion requires obtaining, from its associated message queue input, data to proceed, the controller may be configured to determine to start execution of an instance of the software robot portion when there is a message in its associated message queue. As another example, when the software robot portion does not require obtaining data from its associated message queue, the controller may determine to cause an instance of the software robot portion to start executing in accordance with a schedule (e.g., every 5 seconds, every day at 8 pm, once at 8 am on Jan. 1, 2015, etc.).

In some embodiments, once the controller determines that an instance of a software robot portion is to be executed, it may select a virtual machine on which to run the instance of the software robot portion as follows: (1) obtain a requirement list for the software robot portion, which indicates the virtual machine resource(s) required for executing an instance of the software robot portion; (2) examine a resources list for every virtual machine to find a virtual machine V whose available resources include all the virtual machine resources indicated by the obtained requirement list; and (3) if such a virtual machine V is found, then the controller may cause an instance of the software robot portion to start executing on the virtual machine V.

It should be appreciated that at any one time, a virtual machine may be running several instances of one or more software robot portions. The available resources on the virtual machine are those virtual machine resources that are not being used by the currently running instances. For example, a virtual machine may have available five counts of virtual machine resource A, three counts of virtual machine resource B. If that virtual machine were running two instances of a software robot portion, each of which requires one count of virtual machine resource A and one count of virtual machine resource B, then three counts of virtual machine resource A and two counts of virtual machine resource B remain available.

In some embodiments, a controller may be provided with configuration information for running a software robot. The information may be provided in any suitable way and in any suitable format, as aspects of the technology described herein are not limited in this respect. In some embodiments, for example, the controller may be provided with a configuration file containing information for running a software robot.

In some embodiments, the information provided to a controller may include at least some (e.g., all) of the following information:

An identifier for the software robot (e.g., "Alpha").

An identifier for each software robot portion of the software robot (e.g., "Alpha-1", "Alpha-2", and "Alpha-3"). In some embodiments, the identifier for a software robot portion may be used to access the queue associated with the software robot portion. For example, a queue associated with a software robot portion may be namespaced by the identifier of the software robot and the identifier of the software robot portion.

For each software robot portion:
  A version number indicating the version of the software robot portion to be executed (e.g., 1.0.0, 2.1.3, etc.)
  A requirements list. For example:
    {"UI Interactions": 1, "Keyboard": 1, "License for S-1": 1}
    {"UI Interactions": 1, "Keyboard": 1, "License for S-2": 1}
  Information indicating whether the software robot portion needs to dequeue work from an associated queue in order to start executing. If it does not, then information is provided that indicates a schedule according to which the software robot portion is to be run. A controller may use this information to determine when to run software robot portions that do not require any input from the associates queues to begin commence execution
  The list of virtual machines that may be used to execute the software robot portion (e.g., "VM-1", "VM-2", "VM-3"). This tells the controller what virtual machines may be used for execution of the software robot portions. It should be appreciated that although a list of virtual machines for a particular software robot portion may be provided as input to the controller, this does not imply that the particular software robot portion has exclusive rights to execute on the virtual machines in the list. It is still possible to concurrently run software robot portions of different software robots on the virtual machine.

In some embodiments, the controller may be implemented using multiple threads, as described in more detail below. It should be appreciated, however, that a controller need not be implemented using multiple threads and, in some embodiments, may be implemented using as a single-threaded software program.

In some embodiments, the controller may be implemented using at least two threads: a background thread and a main thread. The background thread may be configured to schedule an instance of a particular software robot portion for execution when the current time matches a time on a pre-specified schedule that indicates when instances of the particular software robot portion are to be executed. To this end, the background thread may create a trigger, which is a record containing at least the following information: (1) a timestamp indicating when the trigger was created; and (2) the identifier of the software robot portion to be executed.

In some of the embodiments in which the controller is implemented using at least two threads, the main thread may be configured to perform the following for each software robot "Y":

Step 1: Check if execution of any running instances of any portion of software robot "Y" has terminated. If so, re-evaluate the remaining resources of the virtual machines that were running those instances and update their respective resource lists.

Step 2: Identify all software robot portions of "Y" that are to be executed. If there are none, then repeat Step 2. Otherwise, select any one such software robot portion (let's call it "X"), and proceed to Step 3. Software robot portion X may be identified as a portion to be executed if:

Software robot portion X needs to dequeue work from its associated queue and there is work W in the queue that has not been assigned to any other instance of software robot portion X; or Software robot portion X does not need to dequeue work from its associated queue and there is a trigger T for X (the trigger may have been generated according to a schedule using a background thread).

Step 3: Determine whether at least one of the virtual machines specified in the configuration information has at least those virtual machine resources available that are required for execution of an instance of software robot portion X. If no such virtual machine is found return to Step 2. Otherwise, select any such virtual machine "V" (e.g., at random or in any other suitable way when there are multiple such virtual machines), and proceed to Step 4.

Step 4:
If software robot portion X needs to dequeue work then we must have found (in Step 2) work W in the queue associated with X, which work was not assigned to any other instance of X. Generate a unique id P. Modify the metadata of W to add the key-value pair whose key is "Instance ID" and value is P. Now the work W is considered assigned to the instance ID P.

If X does not dequeue work then delete the trigger T.

Step 5: Give a command to start an instance of software robot portion X on virtual machine V with an instance ID P. Then re-evaluate the remaining resources for virtual machine V taking into account that a new instance of software robot portion X has commenced execution. Go to Step 2.

In some embodiments, an instance of a software robot portion may be assigned an instance ID. This identifier, which may be a string in some embodiments, may be a unique identifier among instances (of any software robot portion of any software robot) managed by the controller. When an instance of a software robot portion dequeues work from its associated queue, then the controller may mark exactly one work W with the instance ID of this instance. This instance ID may be given to instance as an input so that it can find the exact work W that the controller wants it to dequeue.

In some embodiments, when the controller decides that it needs to run an instance of a software robot portion based on a schedule, the controller keeps a trigger corresponding to that in its memory. This trigger may be removed only when the controller finds a virtual machine having sufficient available virtual machine resources to run the instance. As a result, if the controller attempts to execute an instance of a software robot portion every 5 seconds, for example, but can run only one instance at a time (due to resource constraints) and every instance takes 60 seconds to complete, then every minute there will be 11 more outstanding triggers than the minute before.

FIGS. 5A-5J provide an illustrative example of executing a software robot Alpha having software robot portions Alpha-1 and Alpha-2. The following information about each of the software robot portions Alpha-1 and Alpha-2 may be used by the controller for scheduling their execution.

Software robot portion Alpha-1:
Version—1.0.0
Input: None (i.e., instances of portion Alpha-1 do not dequeue any work done by any other software robot portions)
Virtual Machine Resource Requirements:
Virtual Machine Resource A: 1
Virtual Machine Resource B: 1
Schedule—Start an instance of this software robot portion every 5 seconds Software robot portion Alpha-2:
Version—1.0.0
Input: Yes (i.e., instances of portion Alpha-2 dequeue work from the queue associated with Alpha-2, which work may be queued into that queue by portion Alpha-1, for example)
Requirements:
Virtual Machine Resource A: 1
Virtual Machine Resource C: 1

In this example, the controller may schedule instances of software robot portions Alpha-1 and Alpha-2 for execution on virtual machines VM-1, VM-2, and VM-3, having the following resources:

VM-1 which has:
VM Resource A: 1,
VM Resource B: 1
VM Resource C: 1
VM-2 which has:
VM Resource A: 1
VM Resource C: 1
VM-3 which has:
VM Resource A: 1
VM resource B: 1

Figure 5A:
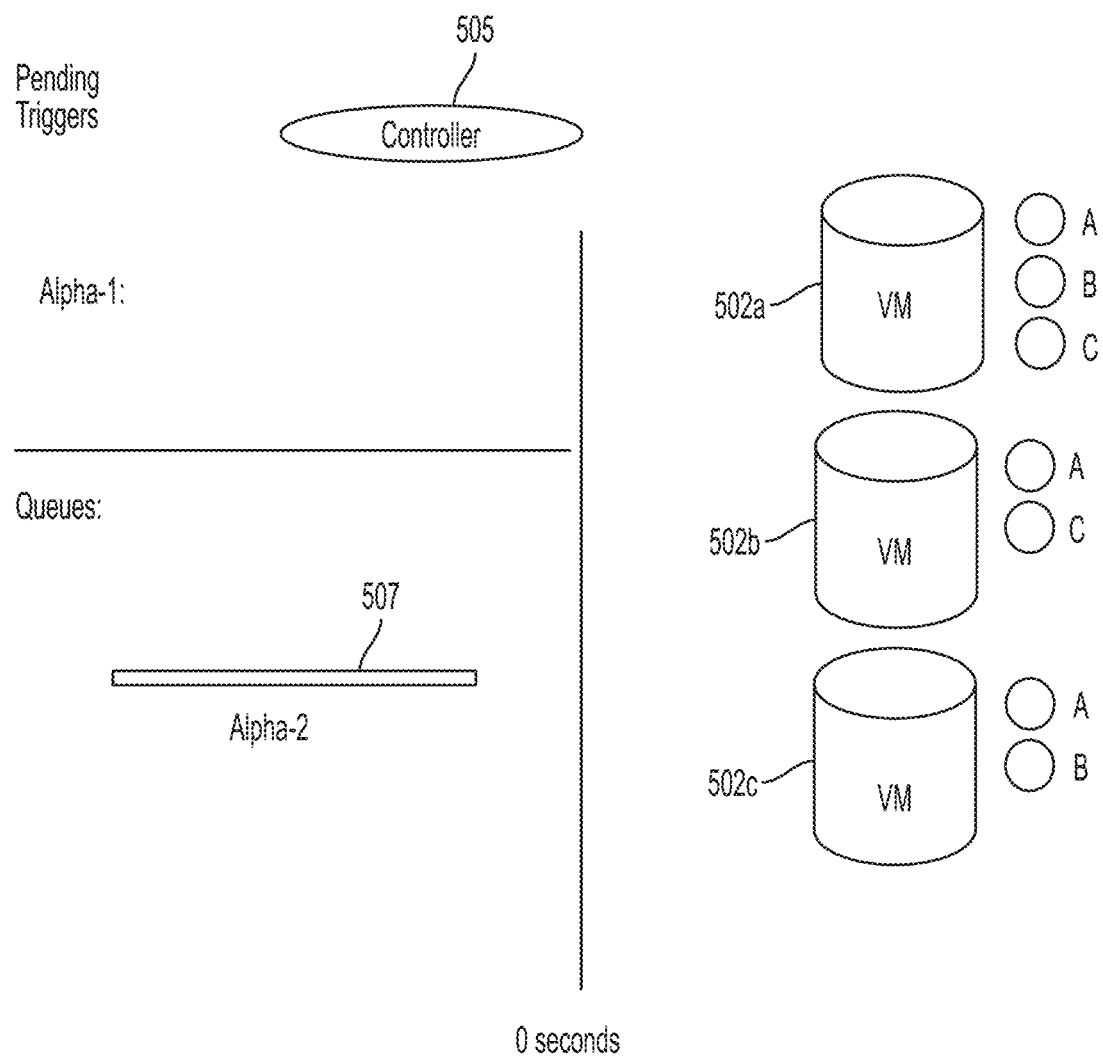
FIGS. 5A-5J show another illustrative example of how software robot portion instances may be executed on a plurality of virtual machines, in accordance with some embodiments of the technology described herein.

In this example, it is assumed that each instance of software robot portion Alpha-1 takes about a minute to execute and that each instance of Alpha-2 takes about 10 minutes to execute. Then, as shown in FIG. 5A, at t=0 seconds, the queue 507 associated with software robot portion Alpha-2 is empty and none of the virtual machines VM-1, VM-2, and VM-3, indicated as virtual machines 502a, 502b, and 502c, respectively, are running any instances of software robot portions Alpha-1 and Alpha-2. In this example, the main thread of controller 505 monitors for the generation of triggers (e.g., by its background thread) to determine whether to attempt to commence execution of an instance of software robot portion Alpha-1. The main thread of controller 505 also monitors queue 507, associated with software robot portion Alpha-2, to determine whether to attempt to commence execution of an instance of software robot portion Alpha-2.

Figure 5B:
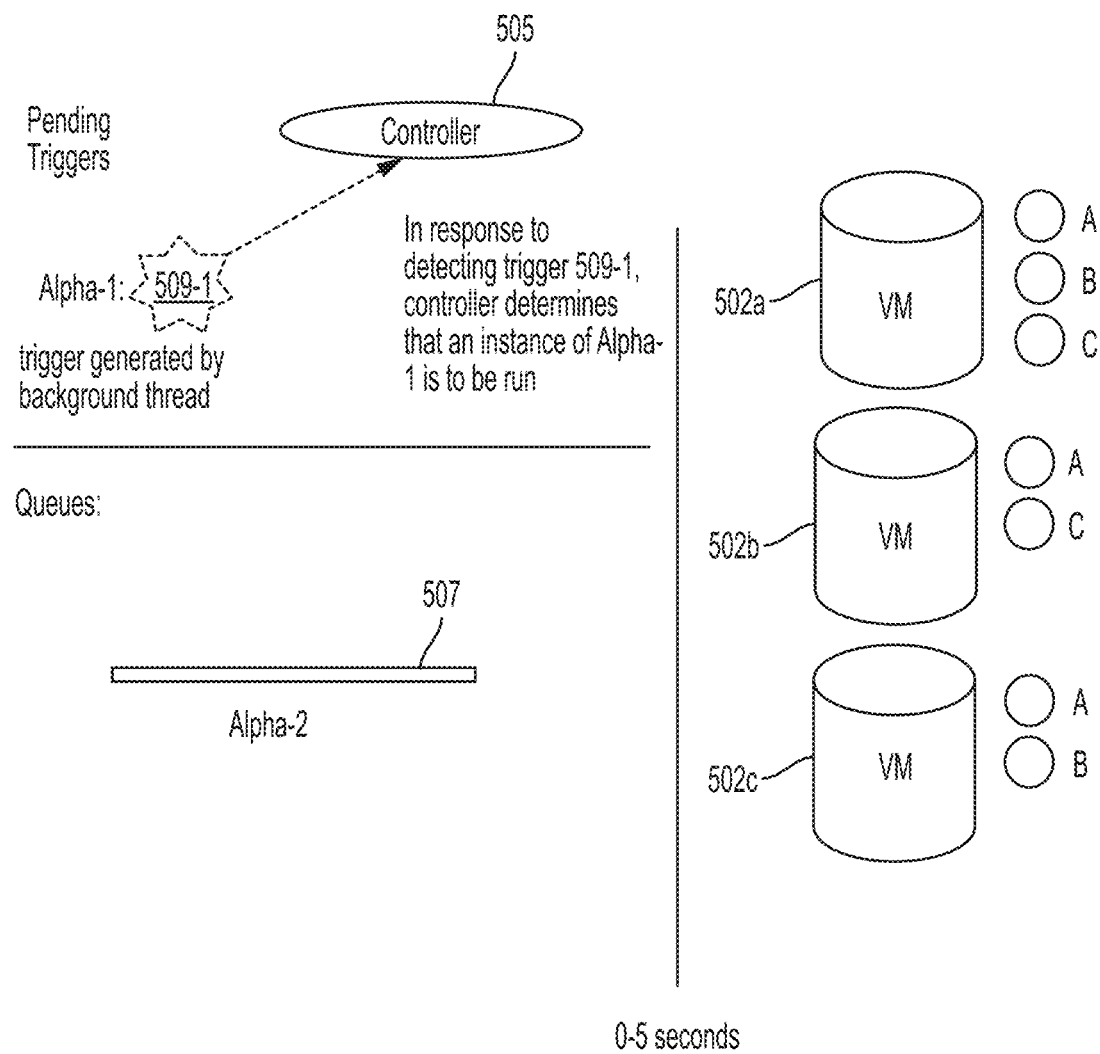
Figure 5C:
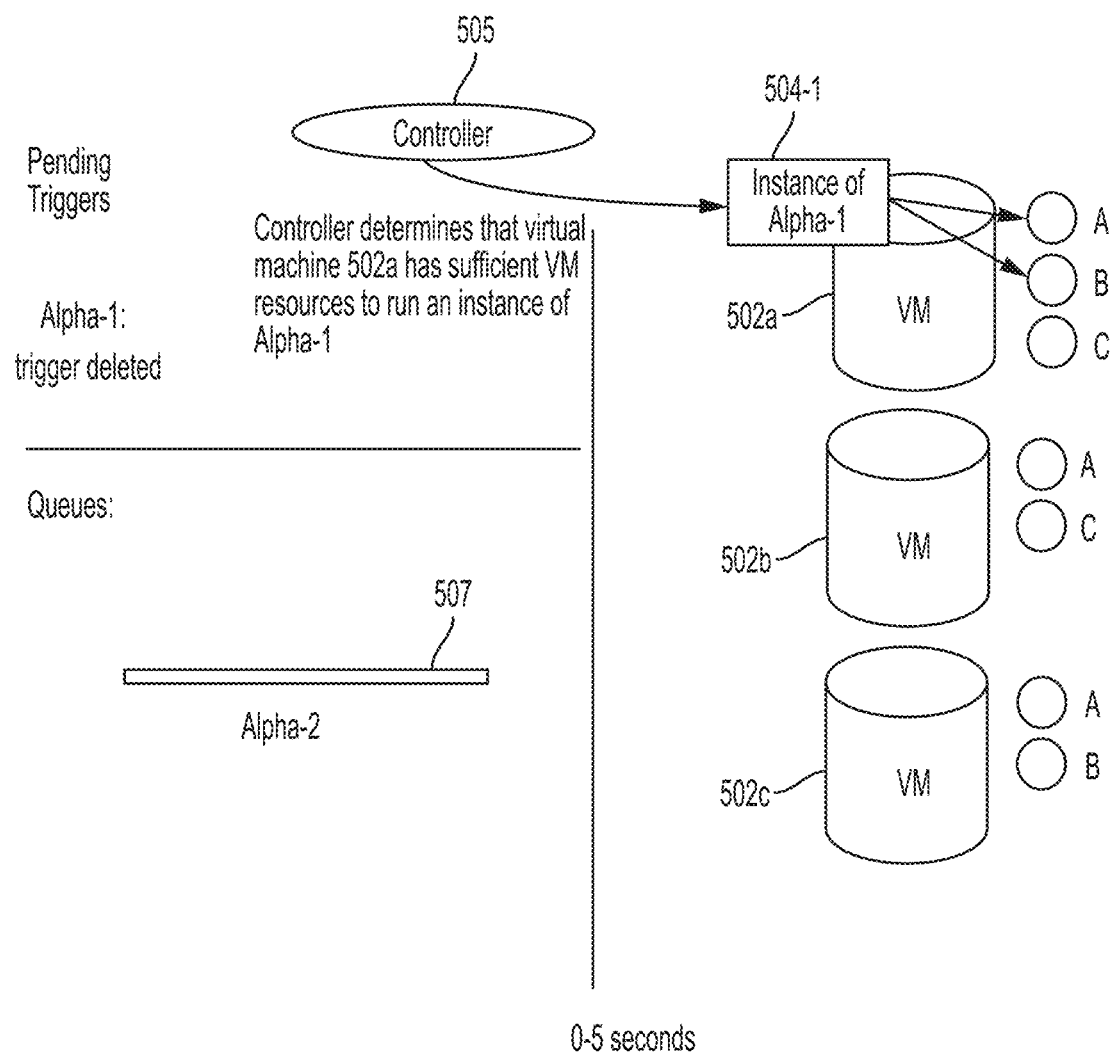

Next, as shown in FIGS. 5B and 5C, during the first five seconds, the controller 505 generates (e.g., using its background thread) trigger 509-1 for an instance of Alpha-1. This trigger is generated because the controller 505 knows from the schedule associated with Alpha-1 that an instance of Alpha-1 is to be executed every five seconds. Since, at this time all, three virtual machines 502a, 502b, and 502c are not running any software robot portion instances, the controller: (1) determines to run an instance of software robot portion Alpha-1 on virtual machine 502a; (2) causes virtual machine 502a to start executing an instance 504-1 of software robot portion Alpha-1; (3) and removes the trigger 509-1 from the list of triggers maintained by the controller.

Figure 5D:
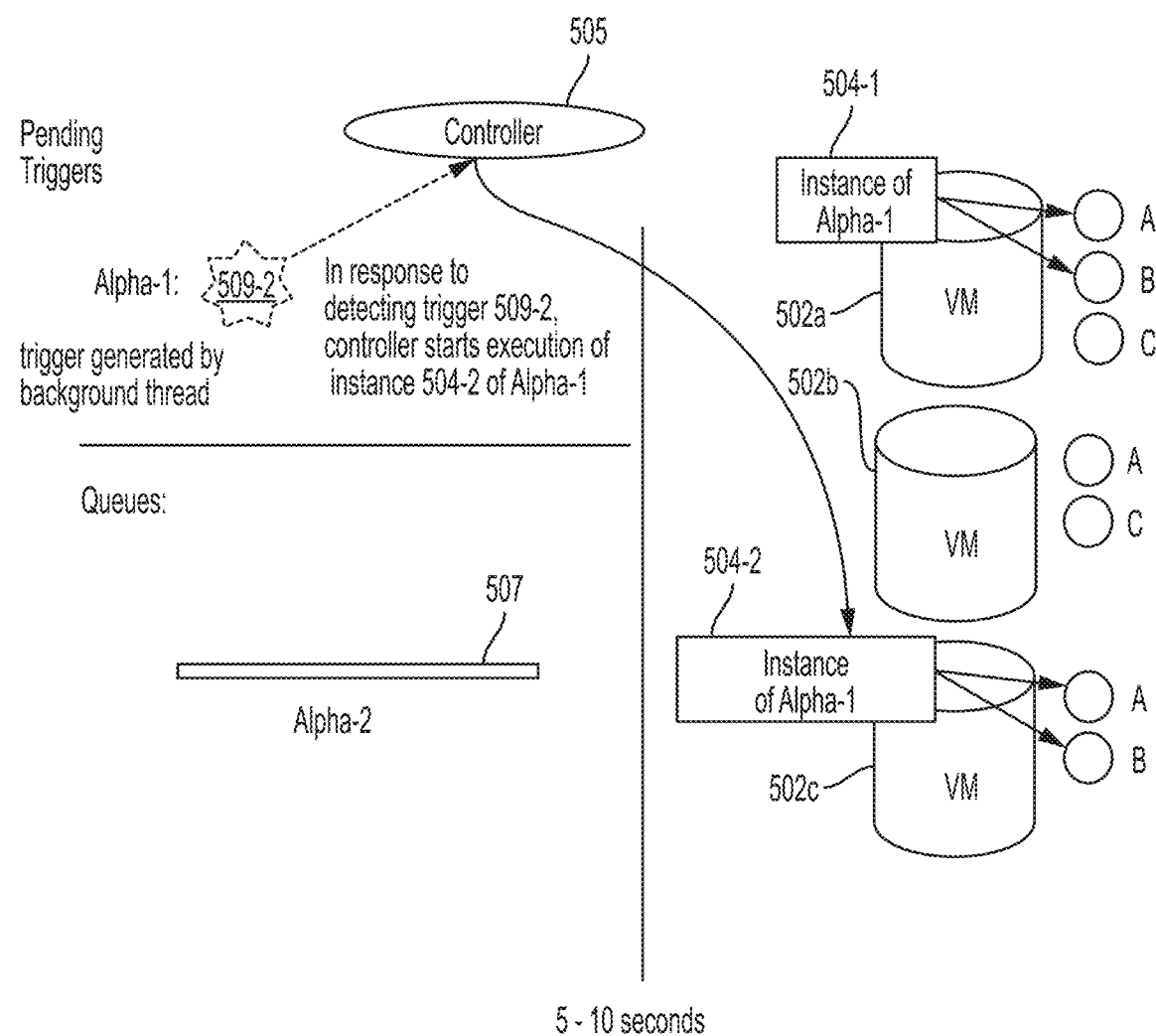

Next, as shown in FIG. 5D, during the second five second period (5<t<10), the controller 505 determines, based on trigger 509-2, that another instance of software robot portion Alpha-1 may be executed on virtual machine 502c. Accordingly, the controller 505 causes the virtual machine 502b to start executing an instance 504-2 of software robot portion Alpha-1 and removes trigger 509-2 from the list of triggers.

Figure 5E:
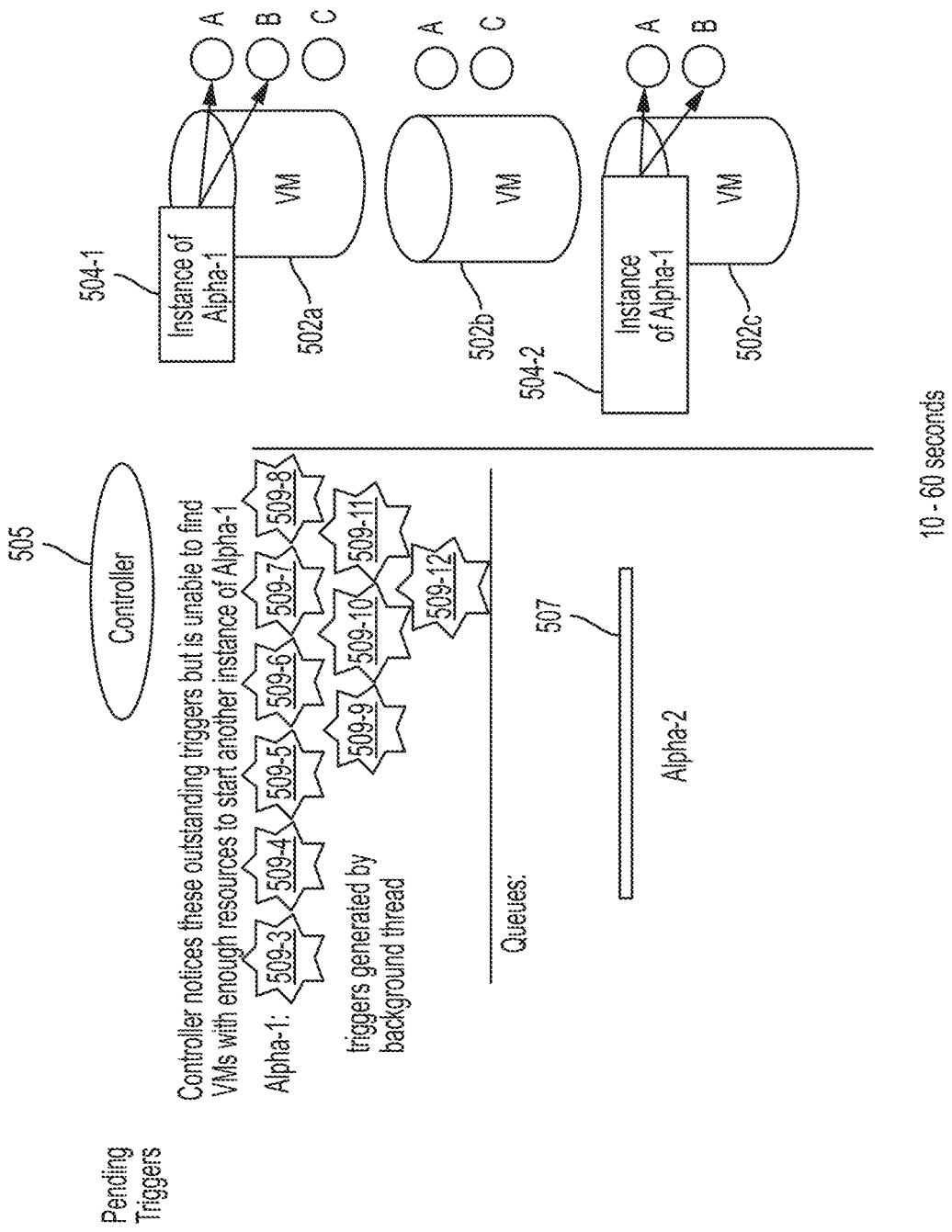

Next, as shown in FIG. 5E, during the time period of 10-60 seconds (10<t<60 seconds), the controller 505 attempts to run an instance of Alpha-1 every five seconds (this occurs about 10 times) because a trigger is generated every 5 seconds, but does not find any virtual machine having sufficient available virtual machine resources to execute an instance of Alpha-1 (Alpha-1 requires access to virtual machine resource B, which is not available on any machine that has it). At the end of this time period, there will be 10 outstanding triggers 509-3, 509-4, . . . , 509-12, for execution of instances of the software robot portion Alpha-1.

Figure 5F:
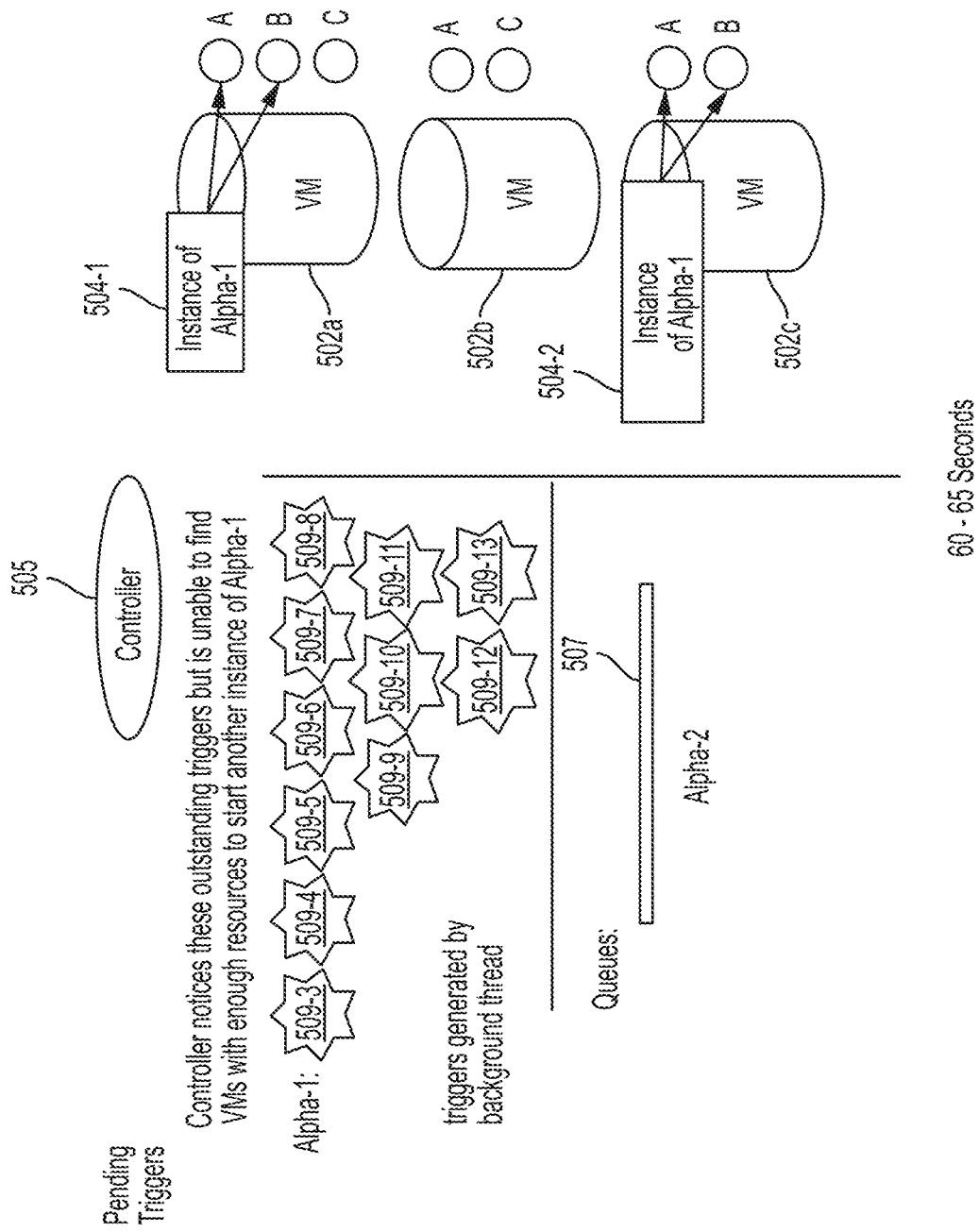
Figure 5G:
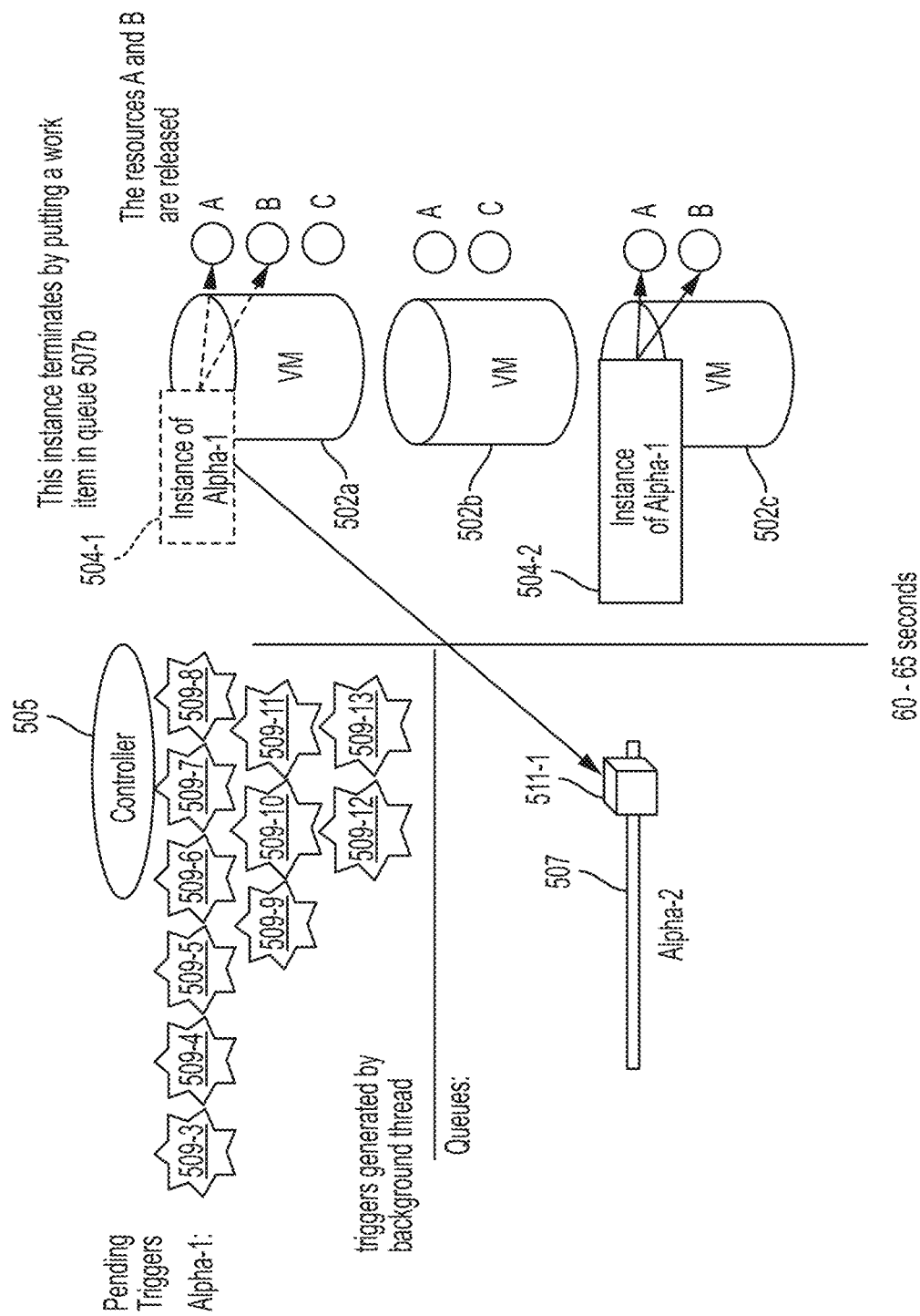
Figure 5H:
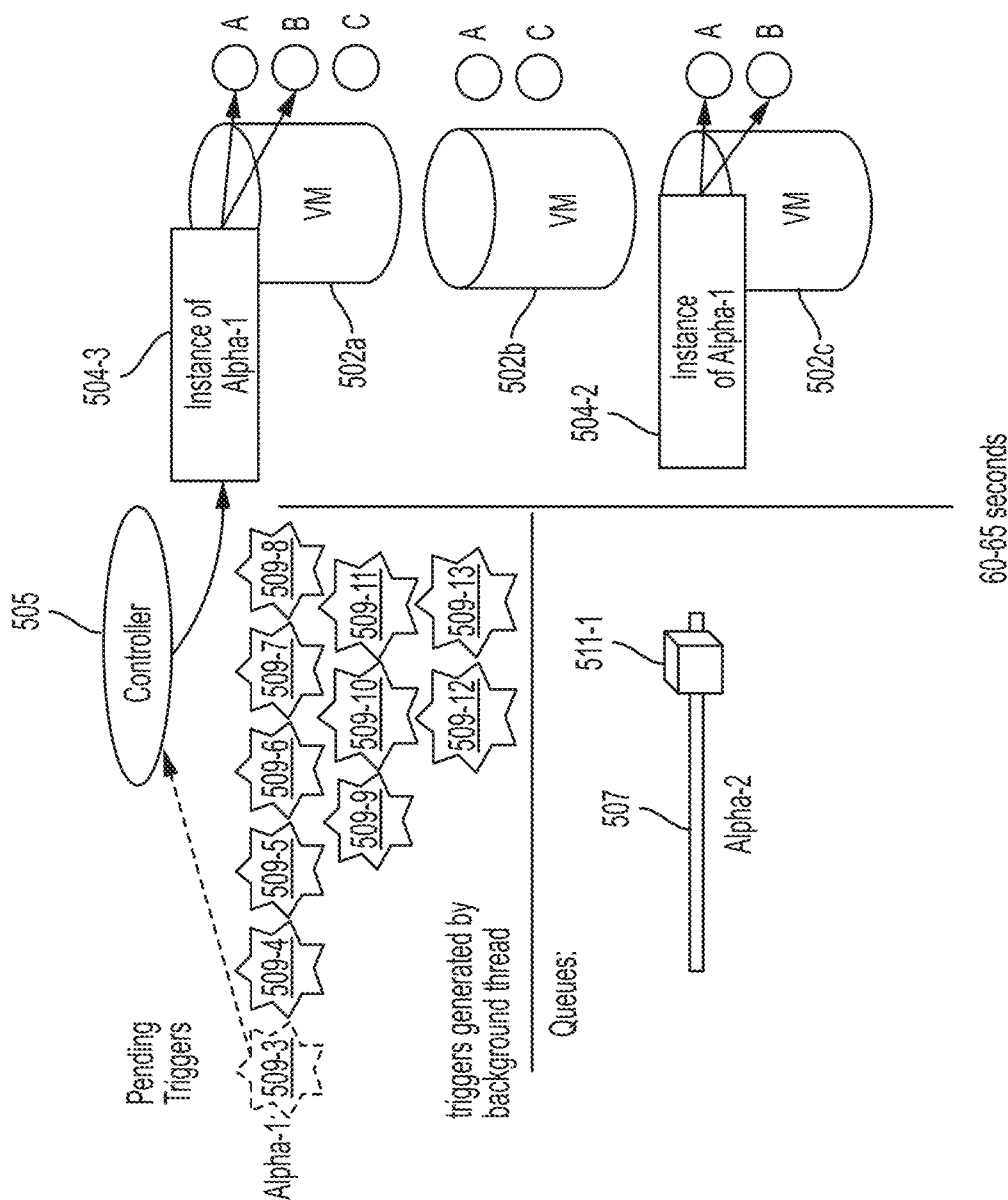
Figure 5I:
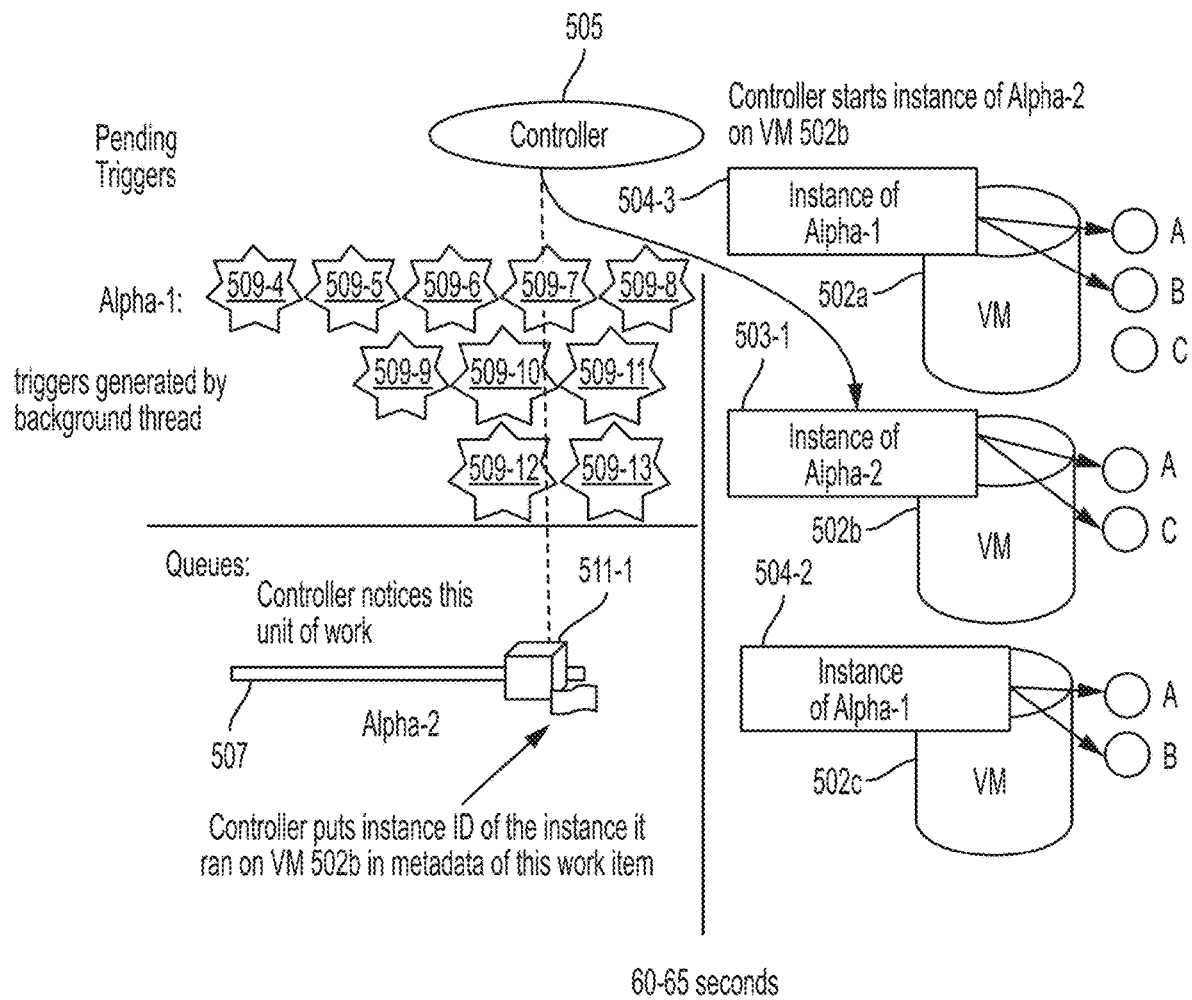
Figure 5J:
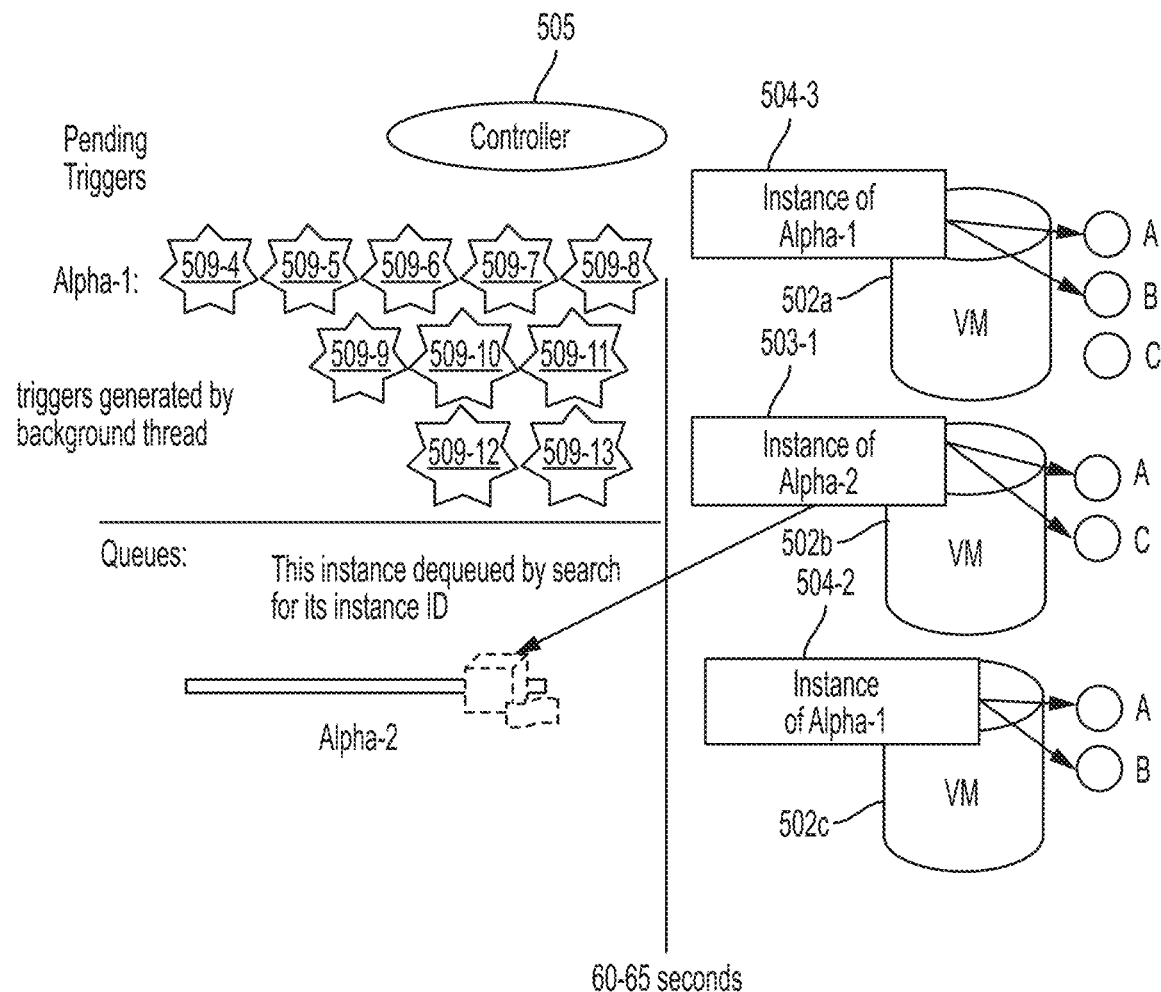

Next, the following things occur during the time period between 60 and 65 seconds (60<t<65):

- The controller 505 adds another trigger 509-13 for execution of an instance of software robot portion Alpha-1, as shown in FIG. 5F.
- The instance 504-1 of software robot portion Alpha-1, which had been executing on virtual machine 502a, completes execution. As a result 1 count of resource A and 1 count of resource B are made available on virtual machine 502b. Prior to completion, the instance 504-1 queues work 511-1 into the queue 507 associated with software robot portion Alpha-2, as shown in FIG. 5G.
- The controller 505 determines that a new instance of Alpha-1 may now be executed on virtual machine 502a because it now has enough available resources to execute the instance. Accordingly, controller 505 causes virtual machine 502a to start execution instance 504-3 of Alpha-1 and removes trigger 509-3, as shown in FIG. 5H.
- The controller 505 determines that the queue 507 associated with software robot portion Alpha-2 contains work 511-1 and also determines that an instance of Alpha-2 may be executed on virtual machine 502b. Accordingly, the controller 505 commences execution of an instance 503-1 of software robot portion Alpha-2 on virtual machine 502c, as shown in FIGS. 5I and 5J.

VIII. Additional Controller Features

A. Expiring Triggers

As may be appreciated from the foregoing example in Section VII, the number of outstanding triggers kept growing for software robot portion Alpha-1 because there were no available virtual machines to execute the triggered instances of Alpha-1. In order to avoid this situation, in some embodiments, each of the triggers may be configured to expire after a threshold amount of time. After a trigger expires, it is deleted. This helps to avoid managing an ever-growing list of triggers and any memory errors that may occur as a result. For example, in the above example, the schedule may still be to generate a trigger every 5 seconds, but the schedule may also specify that each trigger expires after 60 seconds, if not used. In this way, there will be no more than 12 outstanding triggers at any one time.

B. Dynamic Prioritization

As discussed above, each work item in a queue associated with a software robot portion may be assigned a priority. In some embodiments, a work item may be assigned a priority by a software robot portion that generated the work item. In this way, the priority for a work item may be set dynamically during execution of one or more software robot portion instances (rather than in advance of execution of any of the software robot portions). This feature is illustrated in the following example.

Consider a software robot for automatically generating diagnoses based on various lab results. This illustrative software robot includes three constituent software robot portions: E-mail Fetcher, Quick Diagnosis, and Confirmatory diagnosis, which are described below.

"Email Fetcher" performs the following functionality:
  Check for e-mail in an inbox.
  When an e-mail is received, extract from the e-mail
    reports R containing test results
  Forward work <R> to a queue associated with the "Quick
    Diagnosis" software robot portion.
"Quick Diagnosis" performs the following functionality
(and takes 10 minutes to run)
  Get work <R> from its associated queue
  Perform a quick initial diagnosis to determine the probable cause "P"
  Is P something that requires immediate attention?
    If yes, then assign high priority to work <P, R> and
      queue into the queue associated with Confirmatory
      Diagnosis software robot portion.
    If no, the Assign low priority to work <P, R> and queue
      into the queue associated with Confirmatory Diagnosis software robot portion.
"Confirmatory Diagnosis" performs the following functionality (and takes an hour to run)
  Get work <P,R> from its associated queue
  Perform confirmatory analysis.
  Send the final report (e.g., via email) to a certified doctor.

Notice that Confirmatory Diagnosis take a longer amount of time to execute than the Quick Diagnosis portion. It is quite possible that the queue associated with the Confirmatory Diagnosis portion may be filled with hundreds units of work having a low priority. Imagine what will happen if some work with a high priority were to come in that same queue. Because of its higher priority, it will be dealt with before all the other lower priority units of work.

IX. Static Software Robot Portions

Although concurrently executing multiple instances of a software robot portion may increase the throughput of work that may be processed, in some situations it may be desirable to execute no more than a single instance of a software robot portion at any one time. Consider, for example, a software robot portion configured to perform the following actions:

1. Fetch "unresolved" user complaints from a web portal.
2. Send the content of the complaint via email to the concerned person.
3. Reply to the user complaint, saying that their complaint has been forwarded to the person responsible.
4. Change the status of this user complaint from "unresolved" to "processing."

Multiple things might go wrong if two instances of such a software robot portion were to read the same complaint. In this example, the following three undesirable things may occur:

1. Two emails, instead of one, will be sent to the person responsible for handling the complaint.
2. Two replies, instead of one, will be sent to the user who submitted the complaint.
3. The first instance of the software robot portion will change the status of the user complaint from "unresolved" to "processing." When the second instance of the software robot portion attempts to also change the status, an error will be generated because the status will have already been changed to "processing."

Accordingly, in some embodiments, the controller may be configured to not launch more than a single instance of a particular software robot portion at any one time across all the virtual machines being managed by the controller. This may be done in any suitable way. For example, in some embodiments, a configuration parameter may be included in the deployment configuration information provided to the controller. The configuration parameter may indicate that no more than a single instance of the particular software robot portion is to be executed at any one time. When no more than one instance of a software robot portion is to be executed at any one time, the software robot portion may be termed "static." Thus, if a controller has launched a first instance of a static software robot portion on a particular virtual machine, the controller will not launch any other instance of the static software robot portion on any virtual machine until the first instance of the static software robot portion terminates.

X. Retriable Software Robot Portions

As described herein, software robots are computer programs that interact with one or more other computer programs (e.g., one or more application programs and/or one or more operating systems). Sometimes a software robot may interact with a computer program that does not behave as expected, and the software robot may experience an error. In such cases, it may be desirable to try executing the software robot again.

Consider the following two software robot portions:

Alpha-1
  Go to file hosting website.
  Enter the filename.
  Click on Download to download the file.
  Check if the file has downloaded. If not, throw an error message.

Alpha-2
  Go to an online banking website.
  Enter the credit card details. Enter the amount you want to pay.
  Click on Pay to pay the amount.
  Check that the next page that opens is the Success page. If not, throw an error message.

There is major difference between these two software robots from the perspective of trying to resolve errors that arise by trying to execute the software robot again. When Alpha-1 throws an error message, there is no harm in retrying the operation. But we cannot do the same when Alpha-2 throws an error message. We can only retry that operation if we are absolutely sure that the financial transaction did not happen. But we don't really know what happened. It's possible that the transaction actually proceeded but we did not see the success page because there was temporary glitch in the internet connection. We can't really be sure, and therefore some complex verifications are required.

Accordingly, in some embodiments, each software robot portion may be associated with a parameter indicating whether or not it is safe to retry executing the software robot portion if an error occurs. Thus, when a software robot portion is indicated as being "retriable," the controller may re-run an instance of the software robot portion if it previously generated an error. On the other hand, when a software robot portion is indicated as not being retriable, the controller is prohibited from re-running an instance of the software robot portion.

XI. A/B Testing and Gradual Release

As discussed herein, configuration information provided to a controller may include a version number for each software robot portion to be executed. For example, the configuration information may indicate that the controller should execute:

Version 1.0.0 of software robot portion Alpha-1;
  Version 1.1.0 of software robot portion Alpha-2;
  Version 2.0.3 of software robot portion Alpha-3.

Figure 6:
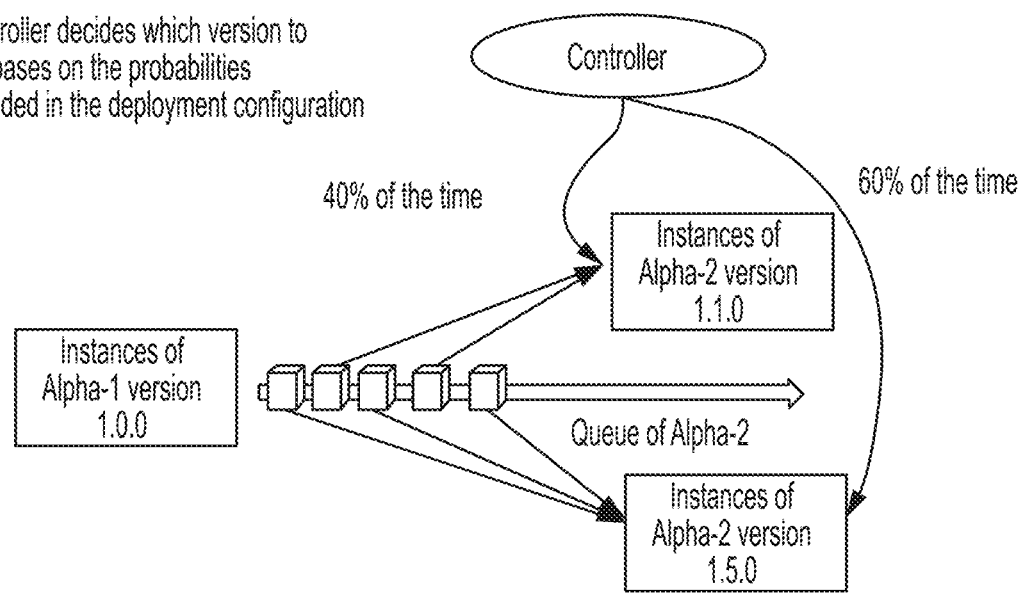
FIG. 6 is a diagram illustrating executing different versions of a software robot instance, in accordance with some embodiments of the technology described herein.

In some embodiments, the configuration information may indicate that multiple versions of a particular software robot portion are to be executed, with each of the versions being executed a specified portion of the time. For example, the configuration information may indicate that the controller should execute:

Version 1.0.0 of Alpha-1
  Version 1.1.0 of Alpha-2 40% of the time, and Version 1.5.0 of Alpha-2 60% of the time (e.g., as shown in FIG. 6)
  Version 2.0.3 of Alpha-3 5% of the time, and Version 2.0.0 of Alpha-3 95% of the time In some embodiments, the controller may determine which version of a software robot portion to execute. This determination may be made using the configuration information, an example of which is described above. Once the controller determines which version to execute, the controller may issue a command to execute an instance of a software robot portion of that version.

In some embodiments, this capability may be used to measure the success rate and/or impact of different versions of the same software robot portion.

In some embodiments, this capability may be used to release, gradually, a new version of a software robot portion. For example, suppose we are running on version 2.0.0 of Alpha-3 and we know that it is stable. Suppose we wish to deploy version 2.0.3 of Alpha-3, but are not sure whether it stable. To minimize potential risk, we can use the above-described feature to instantiate the new version no more than 1% of the time (with version 2.0.0 being instantiated for the other 99% of the time). After we are satisfied that those 1% of the jobs did indeed succeed, we can increase its rate from 1% to 5% and then maybe to 100% eventually.

XII. Additional Benefits

A. Terminating Sub Software Robots

Recall that we did not use the loopback mechanism while designing software robot portions. This is a conscious design choice inspired from the well-known fact that a long running process is prone to errors due to memory leaks (e.g., in the process and/or in one or more of the applications and libraries being used by the process) that aggregate over time. Conventional techniques for designing software robots rely on the loopback mechanism to have a single software robot perform one job after another and run for a long time. In this case, it is quite common to see the software robot start to exhibit errors or errant behavior after executing for a period of time (e.g., a few days or weeks). In such cases, simply restarting the software robot may be enough to resolve any issues with the software robot (e.g., memory leaks). By contrast, the framework described herein does not involve running any software robot portion indefinitely (which could result in memory leaks). Rather, each software robot portion terminates after it processes the assigned unit of work (which typically takes from a few minutes to a few hours).

B. Scaling Up/Scaling Down

The deployment of software robots is easy when using the framework described herein. Deploying a software robot on a new virtual machine or machines may be accomplished simply by changing one field in the deployment configuration information.

C. Pausing One or More Software Robot Portions

Figure 7A:
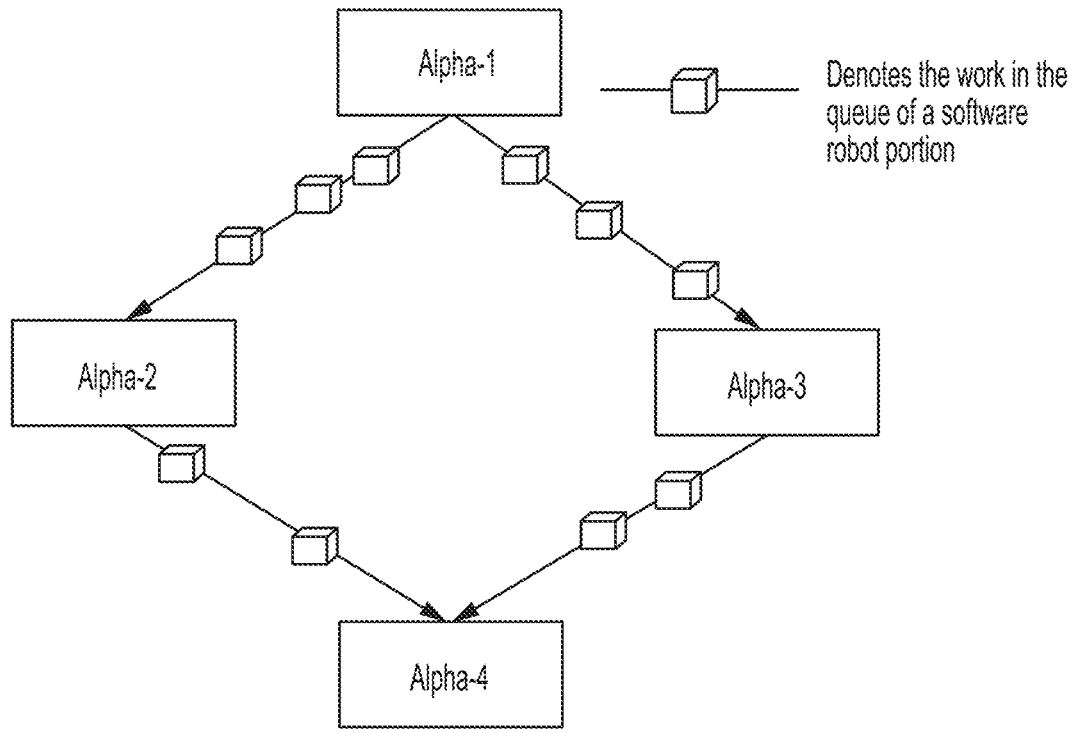
FIGS. 7A-7B illustrate pausing execution of one or more software robot portions, in accordance with some embodiments of the technology described herein.
Figure 7B:
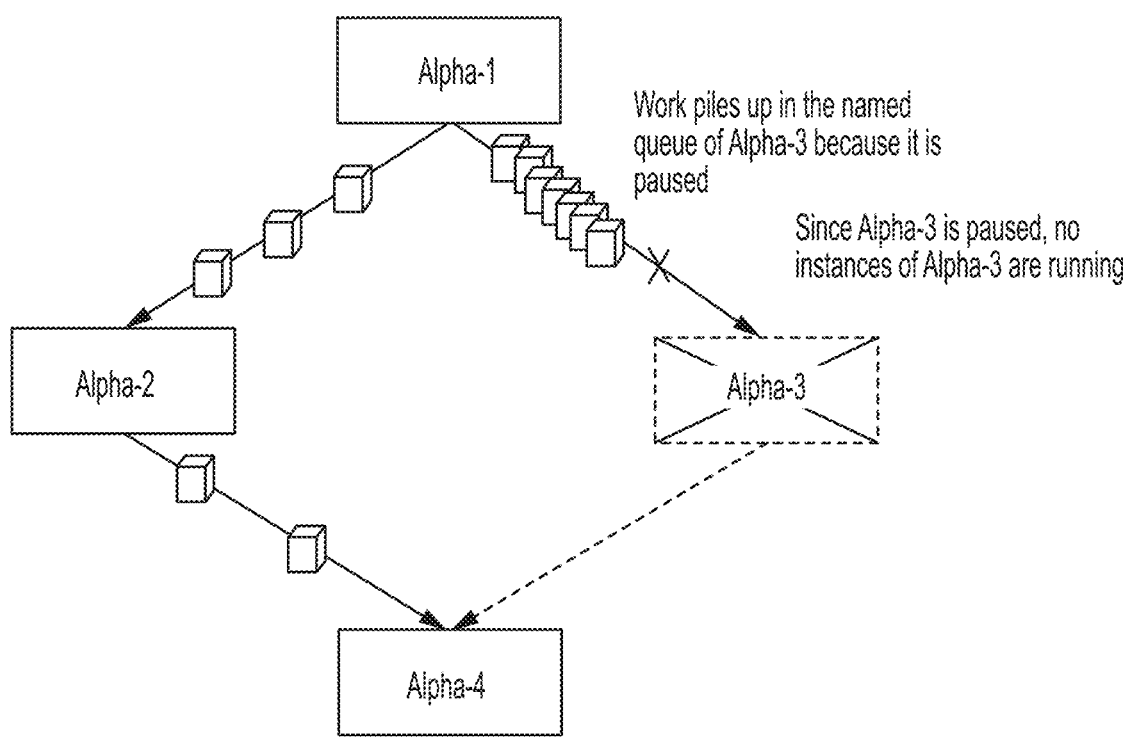

With the framework described herein, it is possible to stop the controller from running instances of certain software robot portions. This may be done in any suitable way. For example, information regarding that software robot portion from the deployment configuration information. A scenario where this becomes is useful is illustrated in FIGS. 7A and 7B. Consider a situation where a software robot is composed of four software robot portions, as shown in FIG. 7A. These portions are:

1. Alpha-1 (takes 1 minute to execute): This portion obtains, from a web portal P1, a request for information. Depending on the type of information requested, Alpha-1 provides the request either to software robot portion Alpha-2 or software robot portion Alpha-3.
2. Alpha-2 (takes 3 hours): This portion receives a request for information from Alpha-1, obtains the requested information, and provides the requested information to web portal P2 and to software robot portion Alpha-4.
3. Alpha-3 (takes 3 hours): This portion receives a request for information from Alpha 1, obtains the requested information, and provides the requested information to web portal P3 and to software robot portion Alpha-4.
4. Alpha-4 (takes 1 minute): Sends a final report via email.

Suppose that web portal P3 becomes inaccessible for some reason. The framework for software robot execution described herein allows the execution of software robot portion Alpha-3 to be paused. Even though instances of this software robot portion are paused, instances of other software robot portions (e.g., portions Alpha-1, Alpha-2, and Alpha-4) may continue to be executed and may continue to process incoming work. Work to be executed by software robot portion Alpha-3 will be queued until the web portal P3 becomes accessible. This is illustrated in FIG. 7B. This is a major win!

XIII. Another Example

To further appreciate the technology described herein and the manner in which it may be applied, consider the following example. Suppose that the following software robots are to be executed.

1. Software Robot Alpha, indicated as 802 in FIG. 8, having three portions:
    Portion Alpha-1, indicated as 802*a* in FIG. 8, having virtual machine resource requirements:
        A: 1
        B: 1
    Portion Alpha-2, indicated as 802*b* in FIG. 8, having virtual machine resource requirements:
        A: 1
        C: 1
    Portion Alpha-3, indicated as 802*c* in FIG. 8, having virtual machine resource requirements:
        D: 1
        E: 1
2. Software Robot Beta, indicated as 804 in FIG. 8, having three portions:
    Portion Beta-1, indicated as 804*a* in FIG. 8, having virtual machine resource requirements:
        B: 1
        C: 2
    Portion Beta-2, indicated as 804*b* in FIG. 8, having virtual machine resource requirements:
        D: 1
        A: 1
    Portion Beta-3, indicated as 804*c* in FIG. 8, having virtual machine resource requirements:
        E: 1
3. Software Robot Gamma, indicated as 806 in FIG. 8, having three portions:
    Portion Gamma-1, indicated as 806*a* in FIG. 8, having virtual machine resource requirements:
        C: 1
    Portion Gamma-2, indicated as 806*b* in FIG. 8, having virtual machine resource requirements:
        B: 1
        C: 1
    Portion Gamma-3, indicated as 806*c* in FIG. 8, having virtual machine resource requirements:
        A: 1
        E: 1
4. Software Robot Delta, indicated as 808 in FIG. 8, having three portions:
    Portion Delta-1, indicated as 808*a* in FIG. 8, having virtual machine resource requirements:
        B: 1
        E: 1
    Portion Delta-2, indicated as 808*b* in FIG. 8, having virtual machine resource requirements:
        A: 2
        B: 1
        C: 1
    Portion Delta-3, indicated as 808*c* in FIG. 8, having virtual machine resource requirements:
        D: 1

Let's consider the following three Virtual machines:
    VM-1, indicated as 805-1 in FIG. 8, having the following virtual machine resources:
        A: 1
        B: 1
        C: 1
        D: 1
    VM-2, indicated as 805-2 in FIG. 8, having the following virtual machine resources:
        A: 2
        B: 2
        C: 2
    VM-3, indicated as 805-3 in FIG. 8, having the following virtual machine resources:
        A: 2
        B: 1
        C: 1
        E: 1

Figure 8:
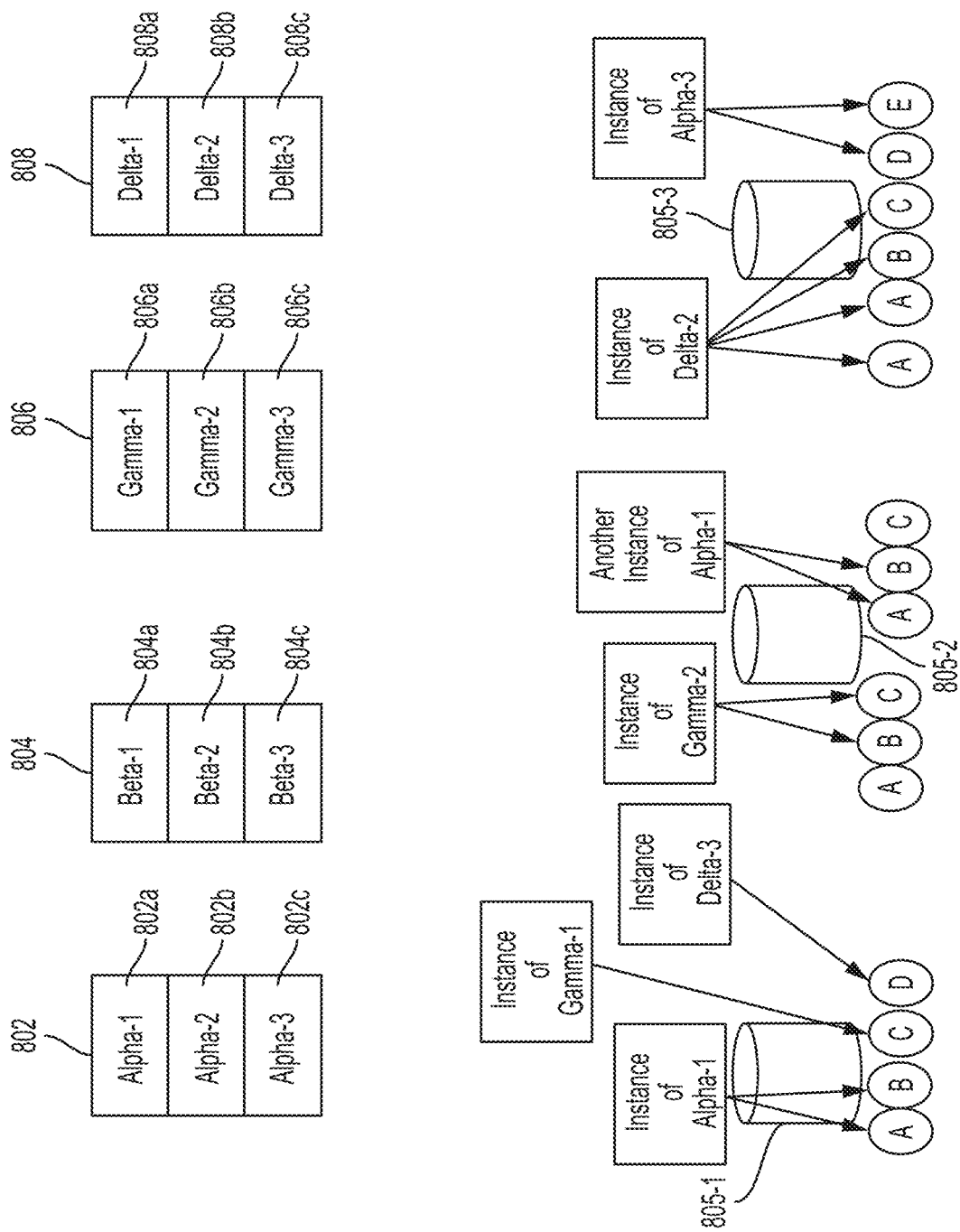
FIG. 8 illustrates execution of software robot portions of different software robots on a common set of virtual machines, in accordance with some embodiments of the technology described herein.

The following scenario, illustrated in the bottom of FIG. 8, is possible:

VM-1 has running:
  One instance of software robot portion Alpha-1
  One instance of software robot portion Gamma-1
  One instance of software robot portion Delta-3

VM-2 has running
  Another instance of software robot portion Alpha-1
  One instance of software robot portion Gamma-2

VM-3 has running
  One instance of software robot portion Delta-2
  One instance of software robot portion Alpha-3

As may be appreciated from this illustrative example of FIG. 8, the framework described herein allows for a single virtual machine to execute instances of software robot portions from different software robots (e.g., portion Alpha-1 and portion Gamma-1). Additionally, the framework described herein allows for different instances of the same software robot portion to execute on different virtual machines. For example, in the illustrative scenario described above, one instance of portion Alpha-1 executes on virtual machine VM-1 and another instance of portion Alpha-2 executes on virtual machine VM-2.

As may be appreciated from the example of FIG. 8, the framework described herein does away with the conventional approach of having to run a single software robot on a single virtual machine. As shown in this example, instances of software robot portions of three different software robots are executing virtual machine VM-1. Different software robot portions of the same software robot may run on different virtual machines. Indeed, a software robot portion may be executed by any virtual machine that has available the virtual machine resources required for the software robot portion to execute. It doesn't matter whether that same virtual machine is executing instances of one or more other software robot portions of the same or other software robots.

XIV. Additional Implementation Detail

Figure 9:
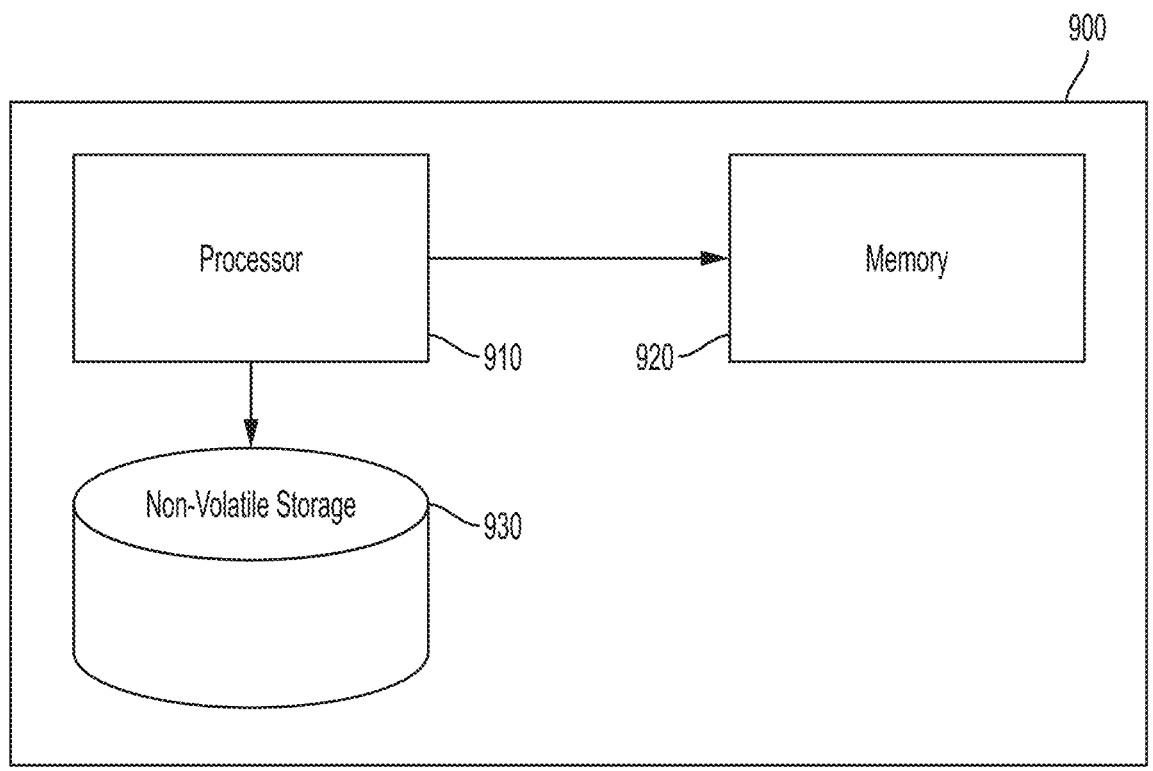
FIG. 9 is a diagram of an illustrative computer system that may be used in implementing some embodiments of the technology described herein.

An illustrative implementation of a computer system 900 that may be used in connection with any of the embodiments of the disclosure provided herein is shown in FIG. 9. The computer system 900 may include one or more computer hardware processors 900 and one or more articles of manufacture that comprise non-transitory computer-readable storage media (e.g., memory 920 and one or more non-volatile storage devices 930). The processor 910(*s*) may control writing data to and reading data from the memory 920 and the non-volatile storage device(s) 930 in any suitable manner. To perform any of the functionality described herein, the processor(s) 910 may execute one or more processor-executable instructions stored in one or more non-transitory computer-readable storage media (e.g., the memory 920), which may serve as non-transitory computer-readable storage media storing processor-executable instructions for execution by the processor(s) 910.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for executing one or more instances of a computer program using a plurality of virtual machines, the computer program comprising multiple computer program portions including a first computer program portion and a second computer program portion, the method comprising:
    using at least one computer hardware processor to perform:
        determining that a first instance of the first computer program portion is to be executed;
        when it is determined that the first instance of the first computer program portion is to be executed,
            accessing first information specifying a first set of one or more virtual machine resources required for executing the first instance of the first computer program portion;
            determining whether any one of the plurality of virtual machines has at least the first set of virtual machine resources available;
            when it is determined that a first virtual machine of the plurality of virtual machines has the first set virtual machine resources available, causing the first virtual machine to execute the first instance of the first computer program portion on the first virtual machine,
            wherein:
                the first set of virtual machine resources of the first virtual machine includes a user interface (UI) interactions resource which provides the first instance of the first computer program portion, when executed by the first virtual machine on a first computing device, with permission to programmatically control one or more other computer programs, when executed on the first virtual machine on the first computing device, through their respective user interfaces by providing the first instance of the first computer program portion with access to a user interface API of an operating system of the first virtual machine;
        maintaining a first message queue for the second computer program portion; and
        queuing an output of the first computer program portion into the first message queue for the second computer program portion.

2. The method of claim 1, further comprising:
    when it is determined that none of the plurality of virtual machines has the first set of virtual machine resources available, waiting to start execution of the first instance of the first computer program portion.

3. The method of claim 1, further comprising:
    when it is determined that a first instance of the second computer program portion is to be executed,
        accessing second information specifying a second set of one or more virtual machine resources required for executing the first instance of the second computer program portion;
        determining whether any one of the plurality of virtual machines has at least the second set of virtual machine resources available; and
        when it is determined that a second virtual machine of the plurality of virtual machines has the second set virtual machine resources available, causing the second virtual machine to execute the first instance of the second computer program portion.

4. The method of claim 3, wherein the first set of virtual machine resources is different from the second set of virtual machine resources.

5. The method of claim 4, wherein the first virtual machine and the second virtual machine are a same virtual machine.

6. The method of claim 4, wherein the first virtual machine and the second virtual machine are different virtual machines.

7. The method of claim 1, further comprising:
    maintaining a first list of available virtual machine resources for the first virtual machine; and
    in response to causing the first virtual machine to execute the first instance of the first computer program portion, updating the first list of available virtual machine resources to reflect that virtual machine resources in the first set of virtual machine resources used for execution of the first computer program portion are not available on the first virtual machine.

8. The method of claim 7, further comprising:
    in response to completion of execution of the first instance of the first computer program portion, updating the list of available virtual machine resources to reflect that the first set of virtual machine resources used for execution of the first computer program portion are available on the first virtual machine.

9. The method of claim 1, wherein the first set of virtual machine resources includes:
    a license to use a computer program installed on the virtual machine and/or service accessible via the virtual machine.

10. The method of claim 1, wherein the first set of virtual machine resources includes a keyboard input resource.

11. The method of claim 1, wherein the first set of virtual machine resources includes a mouse input resource.

12. The method of claim 1, wherein the first set of virtual machine resources does not include an amount of processing power, memory, or network bandwidth available on any of the plurality of virtual machines.

13. The method of claim 1, further comprising:
    maintaining, for each of the multiple computer program portions, a respective set of work assignments to be performed by the multiple computer program portion.

14. The method of claim 13, wherein the maintaining comprises:
    maintaining a second message queue of work assignments to be performed by instances of the first computer program portion; and maintaining the first message queue of work assignments to be performed by instances of the second computer program portion.

15. The method of claim 14, wherein determining whether an instance of any of the multiple computer program portions is to be executed comprises determining whether there is a work assignment in the second message queue to be executed by an instance of the first computer program portion or a work assignment in the first message queue to be executed by an instance of the second computer program portion.

16. The method of claim 1, wherein causing the first virtual machine to execute the first instance of the first computer program portion comprises:
sending a command to the first virtual machine to begin execution of the first instance of the first computer program portion.

17. The method of claim 1, further comprising:
identifying the multiple computer program portions within the computer program.

18. The method of claim 1,
wherein there are at least two different versions of the first computer program portion including a first version of the first computer program portion and a second version of the first computer program portion,
wherein, when it is determined that an instance of the first computer program portion is to be executed, selecting either the first version or the second version of the first computer program portion; and
when it is determined that the first virtual machine of the plurality of virtual machines has the first set virtual machine resources available, causing the first virtual machine to execute an instance of the selected version of the first computer program portion.

19. The method of claim 18, wherein selecting either the first version or the second version of the first computer program portion to be executed comprises selecting the first version at least a specified percentage of the time.

20. The method of claim 1, wherein the computer program is a software robot computer program configured to control one or more other computer programs via their respective graphical user interfaces.

21. The method of claim 1, wherein the user interface API is the Windows Automation API.

22. A system for executing one or more instances of a computer program, the computer program comprising multiple computer program portions including a first computer program portion and a second computer program portion, the system comprising:
a first set of one or more computer hardware processors configured to execute a plurality of virtual machines;
a controller device comprising at least one computer hardware processor configured to perform:
determining whether a first instance of the first computer program portion is to be executed;
when it is determined that the first instance of the first computer program portion is to be executed,
accessing first information specifying a first set of one or more virtual machine resources required for executing the first instance of the first computer program portion;
determining whether any one of the plurality of virtual machines has at least the first set of virtual machine resources available;
when it is determined that a first virtual machine of the plurality of virtual machines has the first set virtual machine resources available, causing the first virtual machine to execute the first instance of the first computer program portion on the first virtual machine,
wherein:
the first set of virtual machine resources of the first virtual machine includes a user interface (UI) interactions resource which provides the first instance of the first computer program portion, when executed by the first virtual machine on a first computing device, with permission to programmatically control one or more other computer programs, when executed on the first virtual machine on the first computing device, through their respective user interfaces by providing the first instance of the first computer program portion with access to a user interface API of an operating system of the first virtual machine;
maintaining a message queue for the second computer program portion; and
queuing an output of the first computer program portion into the message queue for the second computer program portion.

23. At least one non-transitory computer-readable storage medium storing processor executable instructions that, when executed by at least one computer hardware processor, cause the at least one computer hardware processor to perform a method for executing one or more instances of a computer program using a plurality of virtual machines, the computer program comprising multiple computer program portions including a first computer program portion and a second computer program portion, the method comprising:
determining whether a first instance of the first computer program portion is to be executed;
when it is determined that the first instance of the first computer program portion is to be executed,
accessing first information specifying a first set of one or more virtual machine resources required for executing the first instance of the first computer program portion;
determining whether any one of the plurality of virtual machines has at least the first set of virtual machine resources available;
when it is determined that a first virtual machine of the plurality of virtual machines has the first set virtual machine resources available, causing the first virtual machine to execute the first instance of the first computer program portion on the first virtual machine,
wherein:
the first set of virtual machine resources of the first virtual machine includes a user interface (UI) interactions resource which provides the first instance of the first computer program portion, when executed by the first virtual machine on a first computing device, with permission to programmatically control one or more other computer programs, when executed on the first virtual machine on the first computing device, through their respective user interfaces by providing the first instance of the first computer program portion with access to a user interface API of an operating system of the first virtual machine;
maintaining a message queue for the second computer program portion; and queuing an output of the first computer program portion into the message queue for the second computer program portion.

\* \* \* \* \*